US011144220B2

(12) United States Patent
Danilov et al.

(10) Patent No.: US 11,144,220 B2
(45) Date of Patent: *Oct. 12, 2021

(54) AFFINITY SENSITIVE STORAGE OF DATA CORRESPONDING TO A DOUBLY MAPPED REDUNDANT ARRAY OF INDEPENDENT NODES

(71) Applicant: EMC IP Holding Company LLC, Hopkinton, MA (US)

(72) Inventors: Mikhail Danilov, Saint Petersburg (RU); Yohannes Altaye, Dumfries, VA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 56 days.

This patent is subject to a terminal disclaimer.

(21) Appl. No.: 16/726,428

(22) Filed: Dec. 24, 2019

(65) Prior Publication Data

US 2021/0191633 A1  Jun. 24, 2021

(51) Int. Cl.
*G06F 3/00* (2006.01)
*G06F 3/06* (2006.01)

(52) U.S. Cl.
CPC .......... *G06F 3/0631* (2013.01); *G06F 3/0604* (2013.01); *G06F 3/0689* (2013.01)

(58) Field of Classification Search
None
See application file for complete search history.

(56) References Cited

U.S. PATENT DOCUMENTS

| | | |
|---|---|---|
| 5,675,802 A | 10/1997 | Allen et al. |
| 5,805,788 A | 9/1998 | Johnson |
| 5,950,225 A | 9/1999 | Kleiman |
| 6,502,243 B1 | 12/2002 | Thomas |
| 7,389,393 B1 | 6/2008 | Karr et al. |
| 7,577,091 B2 | 8/2009 | Antal et al. |
| 7,631,051 B1 | 12/2009 | Fein et al. |
| 7,664,839 B1 | 2/2010 | Karr et al. |
| 7,680,875 B1 | 3/2010 | Shopiro et al. |
| 7,721,044 B1 | 5/2010 | Chatterjee et al. |

(Continued)

OTHER PUBLICATIONS

Non-Final Office Action received for U.S. Appl. No. 16/231,018 dated May 8, 2020, 78 pages.

(Continued)

*Primary Examiner* — Craig S Goldschmidt
(74) *Attorney, Agent, or Firm* — Amin, Turocy & Watson, LLP

(57) ABSTRACT

Affinity sensitive storage of data corresponding to a doubly mapped redundant array of independent nodes, e.g., a doubly mapped cluster, in a real storage system, e.g., a real cluster, is disclosed. Different mappings of data to a doubly mapped cluster corresponding to real cluster storage locations can result in different levels of affinity between real disks and/or real nodes of the real cluster. A data storage scheme can be selected based on disk affinity scores and node affinity scores to provide access to stored data that can be more resilient against a real disk and/or a real node becoming less accessible. Further, data recovery from a real disk/node that has become less accessible can be improved where data is stored based on the disclosed disk affinity scores and/or node affinity scores.

20 Claims, 12 Drawing Sheets

(56) References Cited

U.S. PATENT DOCUMENTS

| | | |
|---|---|---|
| 8,125,406 B1 | 2/2012 | Jensen et al. |
| 8,261,033 B1 | 9/2012 | Slik et al. |
| 8,370,542 B2 | 2/2013 | Lu et al. |
| 8,479,037 B1 | 7/2013 | Chatterjee et al. |
| 8,495,465 B1 | 7/2013 | Anholt et al. |
| 8,540,625 B2 | 9/2013 | Miyoshi |
| 8,683,205 B2 | 3/2014 | Resch et al. |
| 8,751,599 B2 | 6/2014 | Tran et al. |
| 8,751,740 B1 | 6/2014 | De Forest et al. |
| 8,751,897 B2 | 6/2014 | Borthakur et al. |
| 8,799,746 B2 | 8/2014 | Baker et al. |
| 8,832,234 B1 | 9/2014 | Brooker et al. |
| 8,856,619 B1 | 10/2014 | Cypher |
| 8,856,624 B1 | 10/2014 | Paniconi |
| 8,972,478 B1 | 3/2015 | Storer et al. |
| 9,003,086 B1 | 4/2015 | Schuller et al. |
| 9,021,296 B1 | 4/2015 | Kiselev et al. |
| 9,037,825 B1 | 5/2015 | Donlan et al. |
| 9,052,942 B1 | 6/2015 | Barber et al. |
| 9,063,838 B1 | 6/2015 | Boyle et al. |
| 9,098,447 B1 | 8/2015 | Donlan et al. |
| 9,208,009 B2 | 12/2015 | Resch et al. |
| 9,218,135 B2 | 12/2015 | Miller et al. |
| 9,244,761 B2 | 1/2016 | Yekhanin et al. |
| 9,268,783 B1 | 2/2016 | Shilane et al. |
| 9,274,903 B1 | 3/2016 | Garlapati et al. |
| 9,280,430 B2 | 3/2016 | Sarfare et al. |
| 9,405,483 B1 | 8/2016 | Wei et al. |
| 9,477,682 B1 | 10/2016 | Bent et al. |
| 9,495,241 B2 | 11/2016 | Flynn et al. |
| 9,619,256 B1 | 4/2017 | Natanzon et al. |
| 9,641,615 B1 | 5/2017 | Robins et al. |
| 9,665,428 B2 | 5/2017 | Vairavanathan et al. |
| 9,747,057 B1 | 8/2017 | Ramani et al. |
| 9,817,713 B2 | 11/2017 | Gupta et al. |
| 9,864,527 B1 | 1/2018 | Srivastav et al. |
| 9,942,084 B1 | 4/2018 | Sorenson, III |
| 10,001,947 B1 | 6/2018 | Chatterjee et al. |
| 10,007,561 B1 | 6/2018 | Pudipeddi et al. |
| 10,055,145 B1 | 8/2018 | Danilov et al. |
| 10,061,668 B1 | 8/2018 | Lazier et al. |
| 10,108,819 B1 | 10/2018 | Donlan et al. |
| 10,127,234 B1 | 11/2018 | Krishnan et al. |
| 10,216,770 B1 | 2/2019 | Kulesza et al. |
| 10,242,022 B1 | 3/2019 | Jain et al. |
| 10,282,262 B2 | 5/2019 | Panara et al. |
| 10,289,488 B1 | 5/2019 | Danilov et al. |
| 10,331,516 B2 | 6/2019 | Danilov et al. |
| 10,361,810 B2 | 7/2019 | Myung et al. |
| 10,387,546 B1* | 8/2019 | Duran ............... G06F 16/9538 |
| 10,496,330 B1 | 12/2019 | Bernat et al. |
| 10,503,611 B1 | 12/2019 | Srivastav et al. |
| 10,567,009 B2 | 2/2020 | Yang et al. |
| 10,579,490 B2 | 3/2020 | Danilov et al. |
| 10,613,780 B1 | 4/2020 | Naeni et al. |
| 10,644,408 B2 | 5/2020 | Sakai et al. |
| 10,705,911 B2 | 7/2020 | Vishnumolakala et al. |
| 10,733,053 B1 | 8/2020 | Miller et al. |
| 10,740,183 B1 | 8/2020 | Blaum et al. |
| 10,797,863 B2 | 10/2020 | Chen et al. |
| 10,846,003 B2 | 11/2020 | Danilov et al. |
| 2002/0166026 A1 | 11/2002 | Ulrich et al. |
| 2002/0191311 A1 | 12/2002 | Ulrich et al. |
| 2005/0080982 A1 | 4/2005 | Vasilevsky et al. |
| 2005/0088318 A1 | 4/2005 | Liu et al. |
| 2005/0108775 A1 | 5/2005 | Bachar et al. |
| 2005/0140529 A1 | 6/2005 | Choi et al. |
| 2005/0234941 A1 | 10/2005 | Watanabe |
| 2006/0047896 A1 | 3/2006 | Nguyen et al. |
| 2006/0075007 A1 | 4/2006 | Anderson et al. |
| 2006/0143508 A1 | 6/2006 | Mochizuki et al. |
| 2006/0265211 A1 | 11/2006 | Canniff et al. |
| 2007/0076321 A1 | 4/2007 | Takahashi et al. |
| 2007/0239759 A1 | 10/2007 | Shen et al. |
| 2007/0250674 A1 | 10/2007 | Findberg et al. |
| 2008/0222480 A1 | 9/2008 | Huang et al. |
| 2008/0222481 A1 | 9/2008 | Huang et al. |
| 2008/0244353 A1 | 10/2008 | Dholakia et al. |
| 2008/0320061 A1 | 12/2008 | Aszmann et al. |
| 2009/0070771 A1 | 3/2009 | Yuyitung et al. |
| 2009/0113034 A1 | 4/2009 | Krishnappa et al. |
| 2009/0172464 A1 | 7/2009 | Byrne et al. |
| 2009/0183056 A1 | 7/2009 | Aston |
| 2009/0204959 A1* | 8/2009 | Anand ............... G06F 9/5027 718/1 |
| 2009/0240880 A1 | 9/2009 | Kawaguchi |
| 2009/0259882 A1 | 10/2009 | Shellhamer |
| 2010/0031060 A1 | 2/2010 | Chew et al. |
| 2010/0094963 A1 | 4/2010 | Zuckerman et al. |
| 2010/0174968 A1 | 7/2010 | Charles et al. |
| 2010/0218037 A1 | 8/2010 | Swartz et al. |
| 2010/0293348 A1 | 11/2010 | Ye et al. |
| 2010/0332748 A1 | 12/2010 | Van der Goot et al. |
| 2011/0029836 A1 | 2/2011 | Dhuse et al. |
| 2011/0106972 A1 | 5/2011 | Grube et al. |
| 2011/0107165 A1 | 5/2011 | Resch et al. |
| 2011/0138148 A1 | 6/2011 | Friedman et al. |
| 2011/0161712 A1 | 6/2011 | Athalye et al. |
| 2011/0196833 A1 | 8/2011 | Drobychev et al. |
| 2011/0246503 A1 | 10/2011 | Bender et al. |
| 2011/0292054 A1 | 12/2011 | Boker et al. |
| 2012/0023291 A1 | 1/2012 | Zeng et al. |
| 2012/0096214 A1 | 4/2012 | Lu et al. |
| 2012/0191675 A1 | 7/2012 | Kim et al. |
| 2012/0191901 A1 | 7/2012 | Norair |
| 2012/0204077 A1 | 8/2012 | D'Abreu et al. |
| 2012/0233117 A1 | 9/2012 | Holt et al. |
| 2012/0311395 A1 | 12/2012 | Leggette et al. |
| 2012/0317234 A1 | 12/2012 | Bohrer et al. |
| 2012/0321052 A1 | 12/2012 | Morrill et al. |
| 2013/0047187 A1 | 2/2013 | Frazier et al. |
| 2013/0054822 A1 | 2/2013 | Mordani et al. |
| 2013/0067159 A1 | 3/2013 | Mehra |
| 2013/0067187 A1 | 3/2013 | Moss et al. |
| 2013/0088501 A1 | 4/2013 | Fell |
| 2013/0097470 A1 | 4/2013 | Fwang et al. |
| 2013/0145208 A1 | 6/2013 | Yen et al. |
| 2013/0238932 A1 | 9/2013 | Resch |
| 2013/0246876 A1 | 9/2013 | Manssour et al. |
| 2013/0290482 A1 | 10/2013 | Leggette |
| 2013/0305365 A1 | 11/2013 | Rubin et al. |
| 2014/0040417 A1 | 2/2014 | Galdwin et al. |
| 2014/0064048 A1 | 3/2014 | Cohen et al. |
| 2014/0115182 A1 | 4/2014 | Sabaa et al. |
| 2014/0164430 A1 | 6/2014 | Hadjieleftheriou et al. |
| 2014/0164694 A1 | 6/2014 | Storer |
| 2014/0250450 A1 | 9/2014 | Yu et al. |
| 2014/0280375 A1 | 9/2014 | Rawson et al. |
| 2014/0281804 A1 | 9/2014 | Resch |
| 2014/0297955 A1 | 10/2014 | Yamazaki et al. |
| 2014/0331100 A1 | 11/2014 | Dhuse et al. |
| 2014/0358972 A1 | 12/2014 | Guarrieri et al. |
| 2014/0359244 A1 | 12/2014 | Chambliss et al. |
| 2014/0380088 A1 | 12/2014 | Bennett et al. |
| 2014/0380125 A1 | 12/2014 | Calder et al. |
| 2014/0380126 A1 | 12/2014 | Yekhanin et al. |
| 2015/0006846 A1 | 1/2015 | Youngworth |
| 2015/0074065 A1 | 3/2015 | Christ et al. |
| 2015/0112951 A1 | 4/2015 | Narayanamurthy et al. |
| 2015/0134626 A1 | 5/2015 | Theimer et al. |
| 2015/0142863 A1 | 5/2015 | Yuen et al. |
| 2015/0178007 A1 | 6/2015 | Moisa et al. |
| 2015/0186043 A1 | 7/2015 | Kesselman et al. |
| 2015/0269025 A1 | 9/2015 | Krishnamurthy et al. |
| 2015/0303949 A1 | 10/2015 | Jafarkhani et al. |
| 2015/0331766 A1 | 11/2015 | Sarfare et al. |
| 2015/0370656 A1 | 12/2015 | Tsafrir et al. |
| 2015/0378542 A1 | 12/2015 | Saito et al. |
| 2016/0011935 A1 | 1/2016 | Luby |
| 2016/0011936 A1 | 1/2016 | Luby |
| 2016/0055054 A1 | 2/2016 | Patterson, III et al. |
| 2016/0162378 A1 | 6/2016 | Garlapati et al. |
| 2016/0169692 A1 | 6/2016 | Gupta |
| 2016/0170668 A1 | 6/2016 | Mehra |

(56) References Cited

U.S. PATENT DOCUMENTS

| | | |
|---|---|---|
| 2016/0217104 A1 | 7/2016 | Kamble et al. |
| 2016/0232055 A1 | 8/2016 | Vairavanathan et al. |
| 2016/0253400 A1 | 9/2016 | McAlister et al. |
| 2016/0277497 A1 | 9/2016 | Bannister et al. |
| 2016/0292429 A1 | 10/2016 | Manville et al. |
| 2016/0294419 A1 | 10/2016 | Sandell et al. |
| 2016/0328295 A1 | 11/2016 | Baptist et al. |
| 2016/0357443 A1 | 12/2016 | Li et al. |
| 2016/0357649 A1 | 12/2016 | Karrotu et al. |
| 2016/0371145 A1 | 12/2016 | Akutsu et al. |
| 2016/0378624 A1 | 12/2016 | Jenkins, Jr. et al. |
| 2016/0380650 A1 | 12/2016 | Balder et al. |
| 2017/0003880 A1 | 1/2017 | Fisher et al. |
| 2017/0004044 A1 | 1/2017 | Tormasov et al. |
| 2017/0017671 A1 | 1/2017 | Baptist et al. |
| 2017/0031945 A1 | 2/2017 | Sarab et al. |
| 2017/0097875 A1 | 4/2017 | Jess et al. |
| 2017/0102993 A1 | 4/2017 | Hu et al. |
| 2017/0116088 A1 | 4/2017 | Anami et al. |
| 2017/0187398 A1 | 6/2017 | Trusov |
| 2017/0187766 A1 | 6/2017 | Zheng et al. |
| 2017/0206025 A1 | 7/2017 | Viswanathan |
| 2017/0206135 A1 | 7/2017 | Zeng |
| 2017/0212680 A1 | 7/2017 | Waghulde |
| 2017/0212845 A1 | 7/2017 | Conway |
| 2017/0235507 A1 | 8/2017 | Sinha et al. |
| 2017/0262187 A1 | 9/2017 | Manzanares et al. |
| 2017/0268900 A1 | 9/2017 | Nicolaas et al. |
| 2017/0285952 A1 | 10/2017 | Danilov et al. |
| 2017/0286009 A1 | 10/2017 | Danilov et al. |
| 2017/0286436 A1 | 10/2017 | Neporada et al. |
| 2017/0286516 A1 | 10/2017 | Horowitz et al. |
| 2017/0288701 A1 | 10/2017 | Slik et al. |
| 2017/0344285 A1 | 11/2017 | Choi et al. |
| 2018/0052744 A1 | 2/2018 | Chen et al. |
| 2018/0063213 A1 | 3/2018 | Bevilacqua-Linn et al. |
| 2018/0074881 A1 | 3/2018 | Burden |
| 2018/0121286 A1 | 5/2018 | Sipos |
| 2018/0129417 A1 | 5/2018 | Sivasubramanian et al. |
| 2018/0181324 A1 | 6/2018 | Danilov et al. |
| 2018/0181475 A1 | 6/2018 | Danilov et al. |
| 2018/0181612 A1 | 6/2018 | Danilov et al. |
| 2018/0246668 A1* | 8/2018 | Sakashita ............... G06F 3/061 |
| 2018/0267856 A1 | 9/2018 | Hayasaka et al. |
| 2018/0267985 A1 | 9/2018 | Badey et al. |
| 2018/0306600 A1 | 10/2018 | Nicolaas et al. |
| 2018/0307560 A1 | 10/2018 | Vishnumolakala et al. |
| 2018/0341662 A1 | 11/2018 | He |
| 2018/0375936 A1 | 12/2018 | Chirammal et al. |
| 2019/0028179 A1 | 1/2019 | Kalhan |
| 2019/0034084 A1* | 1/2019 | Nagarajan ............... G06F 3/067 |
| 2019/0043201 A1 | 2/2019 | Strong et al. |
| 2019/0043351 A1 | 2/2019 | Yang et al. |
| 2019/0050301 A1 | 2/2019 | Juniwal et al. |
| 2019/0065092 A1 | 2/2019 | Shah et al. |
| 2019/0065310 A1 | 2/2019 | Rozas |
| 2019/0114223 A1 | 4/2019 | Pydipaty et al. |
| 2019/0205437 A1 | 7/2019 | Larson et al. |
| 2019/0215017 A1 | 7/2019 | Danilov et al. |
| 2019/0220207 A1 | 7/2019 | Lingarajappa |
| 2019/0356416 A1 | 11/2019 | Yanovsky et al. |
| 2019/0384500 A1 | 12/2019 | Danilov et al. |
| 2019/0386683 A1 | 12/2019 | Danilov et al. |
| 2020/0026810 A1 | 1/2020 | Subramaniam et al. |
| 2020/0042178 A1 | 2/2020 | Danilov et al. |
| 2020/0050510 A1 | 2/2020 | Chien et al. |
| 2020/0104377 A1 | 4/2020 | Earnesty, Jr. et al. |
| 2020/0117556 A1 | 4/2020 | Zou et al. |

OTHER PUBLICATIONS

Notice of Allowance dated May 11, 2020 for U.S. Appl. No. 16/240,193, 24 pages.

Non-Final Office Action received for U.S. Appl. No. 16/228,624 dated Jun. 24, 2020, 65 pages.

Non-Final Office Action received for U.S. Appl. No. 16/240,272 dated Jun. 29, 2020, 64 pages.

Non-Final Office Action received for U.S. Appl. No. 16/228,612 dated Jun. 29, 2020, 62 pages.

Final Office Action received for U.S. Appl. No. 16/010,255 dated Jul. 23, 2020, 36 pages.

Office Action received for U.S. Appl. No. 16/010,246 dated Jul. 27, 2020 36 pages.

Office Action received for U.S. Appl. No. 16/177,278, dated Aug. 21, 2020, 53 pages.

Office Action received for U.S. Appl. No. 16/179,486, dated Aug. 13, 2020, 64 pages.

Guo et al., "GeoScale: Providing Geo-Elasticity in Distributed Clouds" 2016 IEEE International Conference on Cloud Engineering, 4 pages.

Guo et al., "Providing Geo-Elasticity in Geographically Distributed Clouds". ACM Transactions on Internet Technology, vol. 18, No. 3, Article 38. Apr. 2018. 27 pages.

Office Action received for U.S. Appl. No. 16/254,073, dated Aug. 18, 2020, 62 pages.

Non-Final Office Action received for U.S. Appl. No. 16/526,142 dated Oct. 15, 2020, 21 pages.

Notice of Allowance received U.S. Appl. No. 16/228,612 date Oct. 20, 2020, 84 pages.

Zhou, et al. "Fast Erasure Coding for Data Storage: A Comprehensive Study of the Acceleration Techniques" Proceedings of the 17th Usenix Conference on File and Storage Technologies (FAST '19), [https://www.usenix.org/conference/fast19/presentation/zhou], Feb. 2019, Boston, MA, USA. 14 pages.

Non-Final Office Action received for U.S. Appl. No. 16/010,255 dated Oct. 29, 2020, 65 pages.

Final Office Action received for U.S. Appl. No. 16/240,272 dated Oct. 27, 2020, 42 pages.

Non-Final Office Action received for U.S. Appl. No. 16/399,902 dated Oct. 28, 2020, 83 pages.

Notice of Allowance received for U.S. Appl. No. 16/374,726 dated Nov. 20, 2020, 78 pages.

Final Office Action received for U.S. Appl. No. 16/228,624 dated Dec. 1, 2020, 63 pages.

Non-Final Office Action received for U.S. Appl. No. 16/570,657 dated Nov. 27, 2020, 75 pages.

Final Office Action received for U.S. Appl. No. 16/177,285 dated Dec. 30, 2020, 61 pages.

Final Office Action received for U.S. Appl. No. 16/511,161 dated Dec. 30, 2020, 61 pages.

Non-Final Office Action received for U.S. Appl. No. 16/399,895 dated Jan. 4, 2021, 64 pages.

Notice of Allowance received for U.S. Appl. No. 16/374,726 dated Jan. 6, 2021, 56 pages.

Non-Final Office Action received for U.S. Appl. No. 16/399,897 dated Feb. 19, 2021, 56 pages.

Non-Final Office Action received for U.S. Appl. No. 16/670,715 dated Mar. 31, 2021, 60 pages.

Final Office Action received for U.S. Appl. No. 16/177,278 dated Feb. 24, 2021, 109 pages.

EMC; "EMC ECS (Elastic Cloud Storage) Architectural Guide v2.x", URL : https://www.dell.com/community/s/vjauj58549/attachments/vjauj58549/solutions-ch/477/1/h14071-ecs-architectural-guide-wp.pdf, Jun. 2015, 21 pages.

Mohan et al., "Geo-aware erasure coding for high-performance erasure-coded storage clusters", Springer Link, URL: https://link.springer.com/artide/10.1007/s 12243-017-0623-2, Jan. 18, 2018.

Final Office Action received for U.S. Appl. No. 16/179,486 dated Jan. 28, 2021, 55 pages.

Non-Final Office Action received for U.S. Appl. No. 16/670,746 dated Feb. 16, 2021, 55 pages.

Dell Technologies, "ECS Overview and Architecture", h14071.18, Feb. 2021, 21 Pages.

Non-Final Office Action received for U.S. Appl. No. 16/177,285 dated Apr. 9, 2021, 41 pages.

(56) References Cited

OTHER PUBLICATIONS

Non-Final Office Action received for U.S. Appl. No. 16/779,208 dated Apr. 20, 2021, 71 pages.
Non-Final Office Action received for U.S. Appl. No. 16/209,185 dated Jun. 18, 2020, 22 pages.
Martin Hosken, Developing a Hyper-Converged Storage Strategy for VMware vCloud Director with VMware vSAN, Jan. 2018 (Year: 2018).
Non-Final Office Action received for U.S. Appl. No. 16/261,549 dated Apr. 15, 2020, 22 pages.
Non-Final Office Action received for U.S. Appl. No. 16/374,726 dated Jun. 2, 2020, 47 pages.
Natarajan, RAID 0, RAID 1, RAID 5, RAID 10 Explained with Diagrams, Aug. 10, 2010, thegeekstuff.com (18 pages).
Non-Final Office Action received for U.S. Appl. No. 16/177,285 dated Jul. 22, 2020, 31 pages.
Non-Final Office Action received for U.S. Appl. No. 16/261,547 dated Sep. 3, 2020, 26 pages.
Non-Final Office Action received for U.S. Appl. No. 16/261,548 dated Aug. 21, 2020, 42 pages.
Notice of Allowance received for U.S. Appl. No. 16/261,549 dated Jul. 17, 2020, 40 pages.
Qiang et al., "Dynamics Process of Long-running Allocation/Collection in Linear Storage Space", International Conference on Networking, Architecture, and Storage (NAS 2007), Guilin, 2007, pp. 209-216.
Non-Final Office Action received for U.S. Appl. No. 16/374,725 dated Aug. 19, 2020, 50 pages.
Non-Final Office Action received for U.S. Appl. No. 16/511,161 dated Jul. 10, 2020, 24 pages.
Notice of Allowance received for U.S. Appl. No. 15/862,547 dated Mar. 29, 2019 27 pages.
Non-Final Office Action received for U.S. Appl. No. 15/792,714 dated Apr. 4, 2019, 20 pages.
Final Office Action received for U.S. Appl. No. 15/792,714 dated Sep. 12, 2019, 43 pages.
Wikipedia "Garbage Collection", URL: https://en.wikipedia.org/wiki/Garbage_collection_(computer science)#Availability (Year: 2017) retrieved using the WayBackMachine, Sep. 8, 2017, 8 pages.
Wikipedia "Erasure code", URL: https://web.archive.org/web/20170908171158/https://en.wikipedia.org/wiki/Erasure_code (Year: 2017), retrieved using the WayBackMachine, Sep. 8, 2017, 5 pages.
Wikipedia "Front and back ends" URL: https://en.wikipedia.org/wiki/Front_and_back_ends (Year:2019), Sep. 6, 2019, 4 pages.
Notice of Allowance received for U.S. Appl. No. 15/792,714 dated Nov. 8, 2019, 31 pages.
Non-Final Office Action received for U.S. Appl. No. 15/791,390 dated Sep. 20, 2019, 27 pages.
Final Office Action received for U.S. Appl. No. 15/791,390 dated Feb. 6, 2020, 29 pages.
Non-Final Office Action received for U.S. Appl. No. 15/791,390 dated Apr. 30, 2020, 48 pages.
Huang et al., "Scale-RS: An Efficient Scaling Scheme for RS-Coded Storage Clusters," in IEEE Transactions on Parallel and Distributed Systems, vol. 26, No. 6, pp. 1704-1717, Jun. 1, 2015.
Non-Final Office Action received for U.S. Appl. No. 16/457,615 dated Jul. 20, 2020, 34 pages.
Non-Final Office Action received for U.S. Appl. No. 15/651,504 dated Mar. 21, 2019, 10 pages.
Non-Final Office Action received for U.S. Appl. No. 15/662,273 dated Nov. 16, 2018, 19 ages.
Final Office Action received for U.S. Appl. No. 15/662,273 dated May 15, 2019, 33 pages.
Non-Final Office Action received for U.S. Appl. No. 15/965,479 dated Apr. 15, 2019, 21 pages.
Non-Final Office Action received for U.S. Appl. No. 15/794,950 dated Jul. 9, 2019, 29 pages.
Final Office Action received for U.S. Appl. No. 15/651,504 dated Sep. 18, 2019, 15 pages.
Non-Final Office Action received for U.S. Appl. No. 15/952,179 dated Sep. 10, 2019, 42 pages.
Wikipedia, "Standard Raid Levels—RAID 6", URL: https://en.wikipedia.org/wiki/Standard_RAID_levels#RAID_6, Oct. 18, 2019, 11 pages.
Non-Final Office Action received for U.S. Appl. No. 15/656,382 dated Nov. 1, 2019, 47 pages.
Final Office Action received for U.S. Appl. No. 15/952,179 dated Nov. 26, 2019, 53 pages.
Non Final Office Action received for U.S. Appl. No. 16/024,314 dated Nov. 25, 2019, 42 pages.
Non-Final Office Action received for U.S. Appl. No. 16/177,278 dated Dec. 2, 2019, 55 pages.
Non-Final Office Action received for U.S. Appl. No. 15/651,504 dated Dec. 31, 2019, 18 pages.
Non-Final Office Action received for U.S. Appl. No. 16/010,246 dated Dec. 5, 2019, 67 pages.
Stonebreaker et al. "Distributed RAID—A New Multiple Copy Algorithm.", IEEE ICDE, 1990, pp. 430-437.
Muralidhar et al. "f4: Facebook's Warm BLOB Storage System", USENIX. OSDI, Oct. 2014, pp. 383-398.
Final Office Action dated Feb. 12, 2020 for U.S. Appl. No. 16/024,314, 29 pages.
Non-Final Office Action received for U.S. Appl. No. 16/010,255 dated Jan. 9, 2020, 31 pages.
Office Action dated Feb. 5, 2020 for U.S. Appl. No. 16/261,551, 30 pages.
Non-Final Office Action received for U.S. Appl. No. 16/228,612 dated Feb. 27, 2020, 49 pages.
Final Office Action received for U.S. Appl. No. 16/010,246 dated Mar. 16, 2020, 33 pages.
Final Office Action received for U.S. Appl. No. 15/656,382 dated Apr. 6, 2020, 31 pages.
Non-Final Office Action received for U.S. Appl. No. 15/582,167 dated Sep. 7, 2018, 19 pages.
Non-Final Office Action received for U.S. Appl. No. 15/952,179 dated Apr. 20, 2020, 68 pages.
Notice of Allowance received for U.S. Appl. No. 16/240,193, dated May 4, 2020, 46 pages.
Final Office Action received for U.S. Appl. No. 16/177,278, dated May 11, 2020, 53 pages.
Thomasian et al., "Hierarchical RAID: Design, performance, reliability, and recovery", J. Parallel Distrib. Comput. Vol. 72 (2012) pp. 1753-1769.
Non-Final Office Action received for U.S. Appl. No. 16/698,096 dated May 24, 2021, 62 pages.
Non-Final Office Action received for U.S. Appl. No. 16/745,855 dated May 13, 2021, 71 pages.
Non-Final Office Action received for U.S. Appl. No. 16/834,649 dated Jun. 24, 2021, 61 pages.
Non-Final Office Action received for U.S. Appl. No. 16/179,486 dated May 12, 2021, 50 pages.
Non-Final Office Action received for U.S. Appl. No. 16/570,657 dated May 12, 2021, 79 pages.
Non-Final Office Action received for U.S. Appl. No. 16/670,765 dated Jul. 20, 2021, 79 pages.

* cited by examiner

1100 →

Real RAIN

| 1 | 1.1 | 2.1 | 3.1 | 4.1 | 5.1 | 6.1 | 7.1 | 8.1 | 9.1 | 10.1 |
|---|---|---|---|---|---|---|---|---|---|---|
| 2 | 1.2 | 2.2 | 3.2 | 4.2 | 5.2 | 6.2 | 7.2 | 8.2 | 9.2 | 10.2 |
| 3 | 1.3 | 2.3 | 3.3 | 4.3 | 5.3 | 6.3 | 7.3 | 8.3 | 9.3 | 10.3 |
| 4 | 1.4 | 2.4 | 3.4 | 4.4 | 5.4 | 6.4 | 7.4 | 8.4 | 9.4 | 10.4 |
| 5 | 1.5 | 2.5 | 3.5 | 4.5 | 5.5 | 6.5 | 7.5 | 8.5 | 9.5 | 10.5 |
| 6 | 1.6 | 2.6 | 3.6 | 4.6 | 5.6 | 6.6 | 7.6 | 8.6 | 9.6 | 10.6 |
| 7 | 1.7 | 2.7 | 3.7 | 4.7 | 5.7 | 6.7 | 7.7 | 8.7 | 9.7 | 10.7 |
| 8 | 1.8 | 2.8 | 3.8 | 4.8 | 5.8 | 6.8 | 7.8 | 8.8 | 9.8 | 10.8 |
| 9 | 1.9 | 2.9 | 3.9 | 4.9 | 5.9 | 6.9 | 7.9 | 8.9 | 9.9 | 10.9 |
| 10 | 1.10 | 2.10 | 3.10 | 4.10 | 5.10 | 6.10 | 7.10 | 8.10 | 9.10 | 10.10 |
| 11 | 1.11 | 2.11 | 3.11 | 4.11 | 5.11 | 6.11 | 7.11 | 8.11 | 9.11 | 10.11 |
| 12 | 1.12 | 2.12 | 3.12 | 4.12 | 5.12 | 6.12 | 7.12 | 8.12 | 9.12 | 10.12 |

Mapped RAIN 1

| | | mapped nodes | | | | | | | |
|---|---|---|---|---|---|---|---|---|---|
| | | 1 | 2 | 3 | 4 | 5 | 6 | 7 | 8 |
| disks | 1 | 1.1 | 2.1 | 3.1 | 4.1 | 5.1 | 6.1 | 7.1 | 8.1 |
| | 2 | 1.2 | 2.2 | 3.2 | 4.2 | 5.2 | 6.2 | 7.2 | 8.2 |
| | 3 | 1.3 | 2.3 | 3.3 | 4.3 | 5.3 | 6.3 | 7.3 | 8.3 |
| | 4 | 1.4 | 2.4 | 3.4 | 4.4 | 5.4 | 6.4 | 7.4 | 8.4 |
| | 5 | 9.1 | 10.1 | 3.5 | 4.5 | 5.5 | 6.5 | 7.5 | 8.5 |
| | 6 | 9.2 | 10.2 | 3.6 | 4.6 | 5.6 | 6.6 | 7.6 | 8.6 |
| | 7 | 9.3 | 10.3 | 3.7 | 4.7 | 5.7 | 6.7 | 7.7 | 8.7 |
| | 8 | 9.4 | 10.4 | 3.8 | 4.8 | 5.8 | 6.8 | 7.8 | 8.8 |

Mapped RAIN 2

| | | mapped nodes | | | | | | | |
|---|---|---|---|---|---|---|---|---|---|
| | | 1 | 2 | 3 | 4 | 5 | 6 | 7 | 8 |
| disks | 1 | 1.5 | 2.5 | 9.5 | 10.5 | 3.9 | 4.9 | 5.9 | 6.9 |
| | 2 | 1.6 | 2.6 | 9.6 | 10.6 | 3.1 | 4.1 | 5.1 | 6.1 |
| | 3 | 1.7 | 2.7 | 9.7 | 10.7 | 7.9 | 8.9 | 5.11 | 6.11 |
| | 4 | 1.8 | 2.8 | 9.8 | 10.8 | 7.1 | 8.1 | 5.12 | 6.12 |

Real RAIN

| disks | mapped nodes | | | | | | | | | |
|---|---|---|---|---|---|---|---|---|---|---|
| | | 1 | 2 | 3 | 4 | 5 | 6 | 7 | 8 | 9 | 10 |
| | 1 | 1.1 | 2.1 | 3.1 | 4.1 | 5.1 | 6.1 | 7.1 | 8.1 | 9.1 | 10.1 |
| | 2 | 1.2 | 2.2 | 3.2 | 4.2 | 5.2 | 6.2 | 7.2 | 8.2 | 9.2 | 10.2 |
| | 3 | 1.3 | 2.3 | 3.3 | 4.3 | 5.3 | 6.3 | 7.3 | 8.3 | 9.3 | 10.3 |
| | 4 | 1.4 | 2.4 | 3.4 | 4.4 | 5.4 | 6.4 | 7.4 | 8.4 | 9.4 | 10.4 |
| | 5 | 1.5 | 2.5 | 3.5 | 4.5 | 5.5 | 6.5 | 7.5 | 8.5 | 9.5 | 10.5 |
| | 6 | 1.6 | 2.6 | 3.6 | 4.6 | 5.6 | 6.6 | 7.6 | 8.6 | 9.6 | 10.6 |
| | 7 | 1.7 | 2.7 | 3.7 | 4.7 | 5.7 | 6.7 | 7.7 | 8.7 | 9.7 | 10.7 |
| | 8 | 1.8 | 2.8 | 3.8 | 4.8 | 5.8 | 6.8 | 7.8 | 8.8 | 9.8 | 10.8 |
| | 9 | 1.9 | 2.9 | 3.9 | 4.9 | 5.9 | 6.9 | 7.9 | 8.9 | 9.9 | 10.9 |
| | 10 | 1.10 | 2.10 | 3.10 | 4.10 | 5.10 | 6.10 | 7.10 | 8.10 | 9.10 | 10.10 |
| | 11 | 1.11 | 2.11 | 3.11 | 4.11 | 5.11 | 6.11 | 7.11 | 8.11 | 9.11 | 10.11 |
| | 12 | 1.12 | 2.12 | 3.12 | 4.12 | 5.12 | 6.12 | 7.12 | 8.12 | 9.12 | 10.12 |

Mapped RAIN 1

| disks | mapped nodes | | | | | | | |
|---|---|---|---|---|---|---|---|---|
| | | 1 | 2 | 3 | 4 | 5 | 6 | 7 | 8 |
| | 1 | 3.1 | 4.1 | 5.1 | 6.1 | 7.1 | 8.1 | 9.1 | 10.1 |
| | 2 | 3.2 | 4.2 | 5.2 | 6.2 | 7.2 | 8.2 | 9.2 | 10.2 |
| | 3 | 3.3 | 4.3 | 5.3 | 6.3 | 7.3 | 8.3 | 9.3 | 10.3 |
| | 4 | 3.4 | 4.4 | 5.4 | 6.4 | 7.4 | 8.4 | 9.4 | 10.4 |
| | 5 | 3.5 | 4.5 | 5.5 | 6.5 | 7.5 | 8.5 | 9.5 | 10.5 |
| | 6 | 3.6 | 4.6 | 5.6 | 6.6 | 7.6 | 8.6 | 9.6 | 10.6 |
| | 7 | 3.7 | 4.7 | 5.7 | 6.7 | 7.7 | 8.7 | 9.7 | 10.7 |
| | 8 | 3.8 | 4.8 | 5.8 | 6.8 | 7.8 | 8.8 | 9.8 | 10.8 |

Mapped RAIN 2

| disks | mapped nodes | | | | | | | |
|---|---|---|---|---|---|---|---|---|
| | | 1 | 2 | 3 | 4 | 5 | 6 | 7 | 8 |
| | 1 | 1.1 | 2.1 | 5.9 | 6.9 | 7.9 | 8.9 | 9.9 | 10.9 |
| | 2 | 1.2 | 2.2 | 5.1 | 6.1 | 7.1 | 8.1 | 9.1 | 10.1 |
| | 3 | 1.3 | 2.3 | 5.11 | 6.11 | 7.11 | 8.11 | 9.11 | 10.11 |
| | 4 | 1.4 | 2.4 | 5.12 | 6.12 | 7.12 | 8.12 | 9.12 | 10.12 |

FIG. 12C

AFFINITY SENSITIVE STORAGE OF DATA CORRESPONDING TO A DOUBLY MAPPED REDUNDANT ARRAY OF INDEPENDENT NODES

TECHNICAL FIELD

The disclosed subject matter relates to data storage and, more particularly, to instantiating a storage service at a real storage device, wherein the storage service instance supports mapped storage via at least one portion of a real storage device of a real node of a real storage cluster, and wherein the mapping is based on a level of affinity between real nodes and/or real extents.

BACKGROUND

Conventional data storage techniques can store data in one or more arrays of data storage devices. As an example, data can be stored in an ECS (formerly known as ELASTIC CLOUD STORAGE) system, hereinafter ECS system, such as is provided by DELL EMC. The example ECS system can comprise data storage devices, e.g., disks, etc., arranged in nodes, wherein nodes can be comprised in an ECS cluster. One use of data storage is in bulk data storage. Data can conventionally be stored in a group of nodes format for a given cluster, for example, in a conventional ECS system, all disks of nodes comprising the group of nodes are considered part of the group. As such, a node with many disks can, in some conventional embodiments, comprise a large amount of storage that can go underutilized. As an example, a storage group of five nodes, with ten disks per node, at 8 terabytes (TB s) per disk is roughly 400 TB in size. This can be excessively large for some types of data storage, however apportioning smaller groups, e.g., fewer nodes, less disks, smaller disks, etc., can be inefficient in regards to processor and network resources, e.g., computer resource usage, to support these smaller groups. As such, it can be desirable to have more granular logical storage groups that can employ portions of larger real groups, thereby facilitating efficient computer resource usage, e.g., via larger real groups, but still providing smaller logical groups that can be used more optimally for storing smaller amounts of data therein.

BRIEF DESCRIPTION OF DRAWINGS

FIG. 11A-C are illustrations of an example mapping of mapped nodes to real nodes, in accordance with aspects of the subject disclosure.

FIG. 12A-C are illustrations of another example mapping of mapped nodes to real nodes, in accordance with aspects of the subject disclosure.

DETAILED DESCRIPTION

Figure 1:
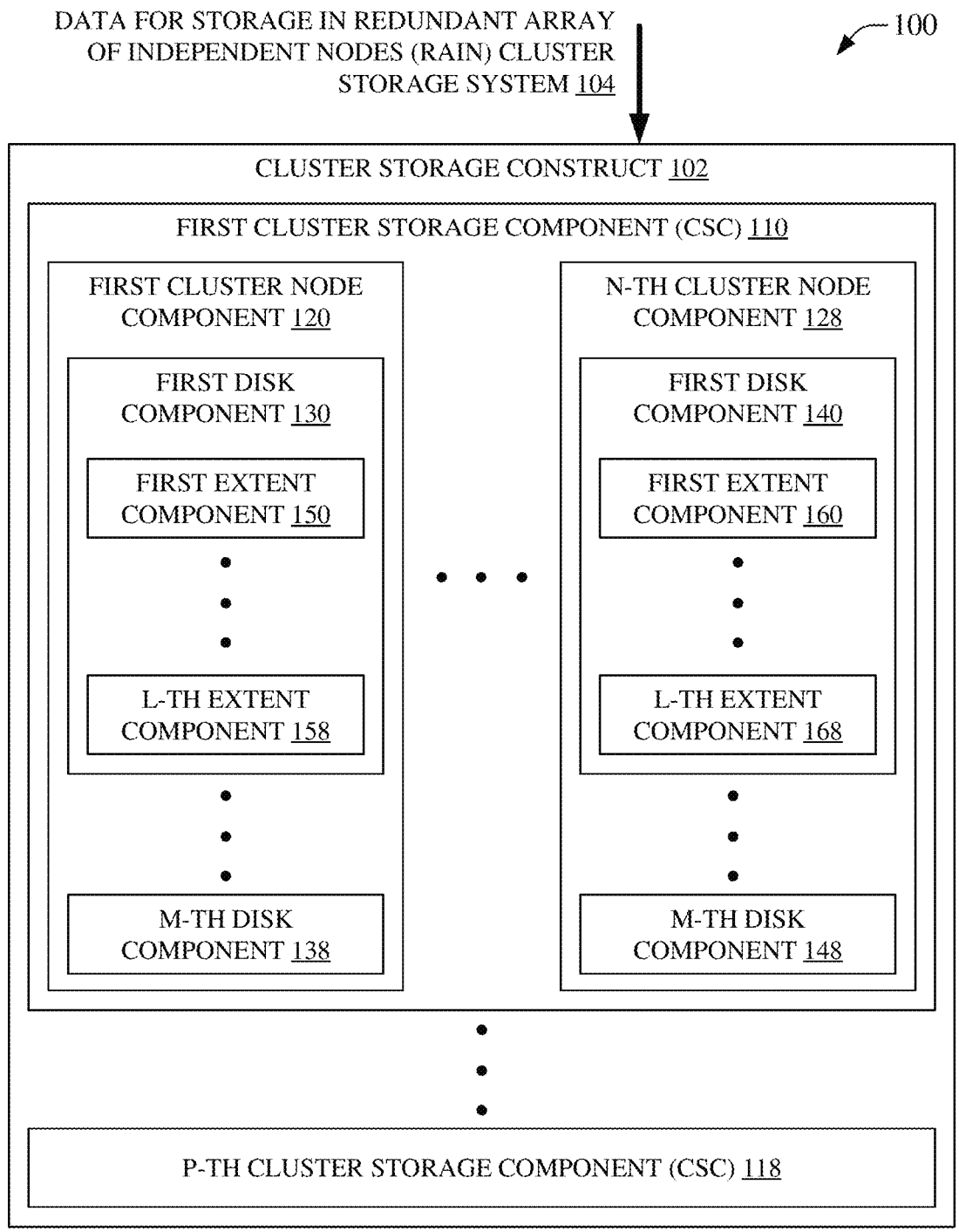
FIG. 1 is an illustration of an example system that can facilitate affinity sensitive data storage at a real node of a doubly mapped RAIN storage system, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As mentioned, data storage techniques can conventionally store data in one or more arrays of data storage devices, hereinafter a cluster, real cluster, cluster storage construct, etc. As an example, data can be stored in an ECS system such as is provided by DELL EMC. The example ECS system can comprise data storage devices, e.g., disks, etc., arranged in nodes, wherein nodes can be comprised in an ECS cluster. A data storage device can comprise one or more extent, wherein the sum of the extents of a data storage device represents the storage capacity of the data storage device, e.g., a 128 MB disk can comprise 128 extents, wherein each of the 128 extents can store approximately 1 MB of data. One use of data storage is in bulk data storage. Data can conventionally be stored in a group of nodes format for a given cluster, for example, in a conventional ECS system, all disks of nodes comprising the group of nodes are considered part of the group. As such, a node with many disks can, in some conventional embodiments, comprise a large amount of storage that can go underutilized. As such, it can be desirable to have more granular logical storage groups that can employ portions of larger real groups, thereby facilitating efficient computer resource usage, e.g., via larger real groups, but still providing smaller logical groups comprised of extents that can be used more efficiently for storing smaller amounts of data therein.

Figure 10:
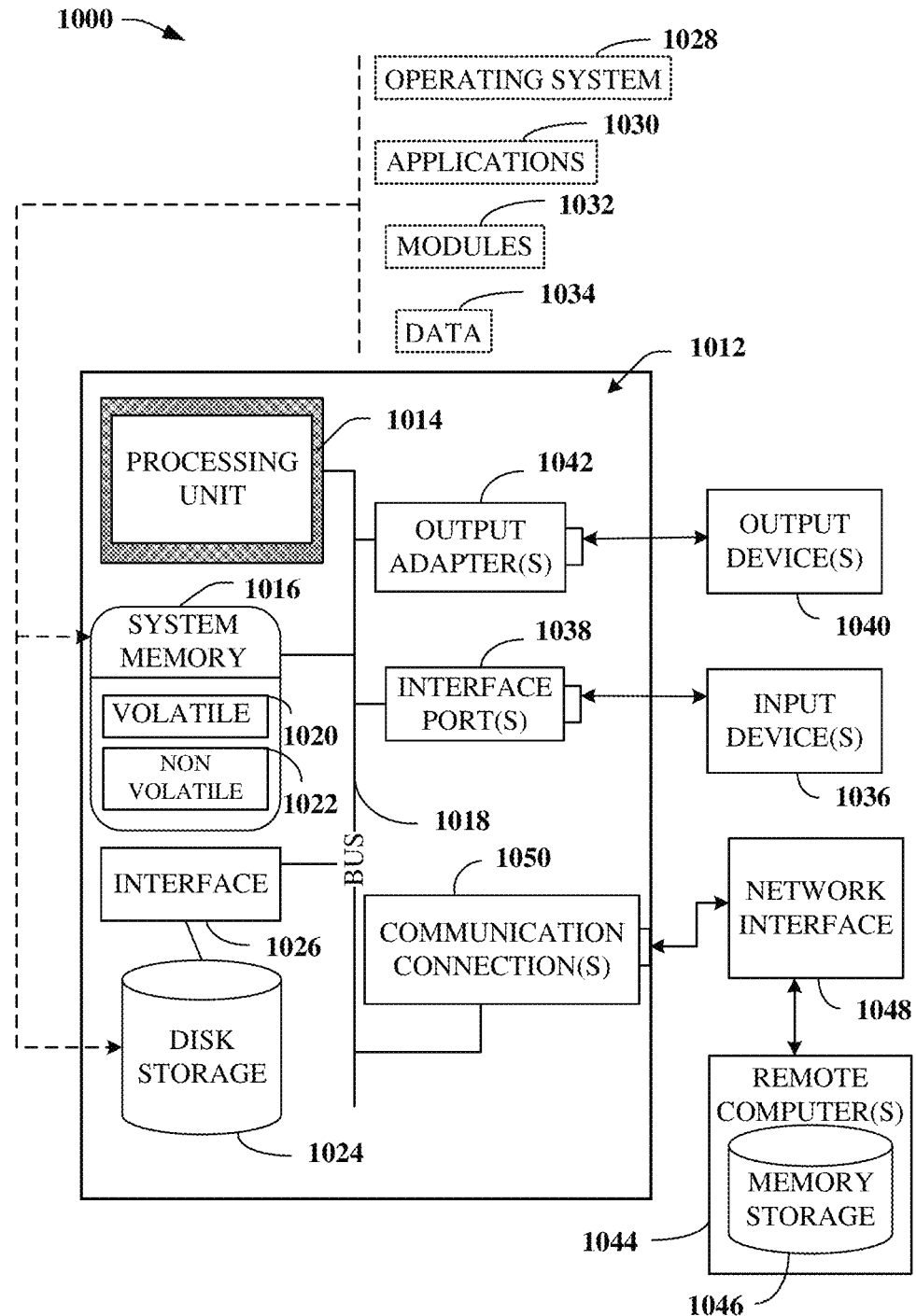
FIG. 10 illustrates an example block diagram of a computing system operable to execute the disclosed systems and methods in accordance with an embodiment.

A real cluster(s) can comprise real nodes, and the real nodes can comprise real data storage devices, which in turn can comprise extents, e.g., real extents of real disks of real nodes. Interaction with, management of, etc., the extents selected to comprise data stored via a mapped node can employ computing resources, e.g., a processor(s), memory (ies), network interface(s), user interface(s), etc., such as are illustrated at FIG. 10, etc. A real node can be a discrete hardware node that comprises real storage devices, for example a real node can comprise a rack mounted controller interacting with M hard disks, for example in a rack that can be separate from another real node that can comprise a second rank mounted controller and other real storage devices. The storage devices of these nodes can be divided into extents to enable more granular use of memory that would be experienced with entire storage devices, e.g., a storage device can be divided into L extents, etc. In an embodiment, a real node can execute operations related to control of the real node, for example, managing data storage space provided some of the L extents of the example M hard disks, of N real nodes of a real cluster, etc. Further, a real node can execute an instance of a mapped cluster storage service that can enable the virtualization of real storage space into doubly mapped clusters that can span real extents of real disks of real nodes of a real cluster(s), e.g., interaction between MCSS instances executing on different real node computing resources can enable data interaction via a mapped cluster comprising mapped nodes comprising mapped disks that store data via real extents of real disks of real nodes of real clusters.

In an embodiment of the presently disclosed subject matter, a doubly mapped redundant array of independent nodes, hereinafter a doubly mapped RAIN, can provide data redundancy that, in an aspect, can allow for failure of a portion of one or more mapped disks, one or more mapped nodes, and/or one or more mapped clusters, etc., without loss of access to stored data; can allow for removal/addition of one or more mapped extents, mapped disks, mapped nodes, etc., from/to the mapped cluster without loss of access to stored data; etc. As an example, a doubly mapped cluster can comprise mapped disks of mapped nodes having a data redundancy scheme analogous to a redundant array of independent disks (RAID) type-6, e.g., RAID6, also known as double-parity RAID, etc., wherein employing a double mapping topology and two parity stripes on each mapped disk/node can allow for two mapped disk/node failures before any data of the mapped cluster may become less accessible, etc. In other example embodiments, a doubly mapped cluster can employ other double mapping topologies and parity techniques to provide data redundancy, e.g., analogous to RAID0, RAID1, RAID2, RAID3, RAID4, RAID5, RAID6, RAID0+1, RAID1+0, etc., wherein a doubly mapped disk/node of a mapped cluster can comprise one or more mapped extents, disks, etc., and the mapped extents can be loosely similar to a disk in a RAID system. Unlike RAID technology, an example doubly mapped RAIN system can provide access to more granular storage in, for example, very large data storage systems that can often on the order of terabytes, petabytes, exabytes, zettabytes, or even larger, because each mapped disk, mapped node, etc., can generally comprise a plurality of mapped extents, mapped disks, etc., unlike conventional RAID technologies.

In an embodiment, software, firmware, etc., can hide an abstraction doubly mapping nodes in a doubly mapped RAIN system, e.g., a group of doubly mapped nodes can appear to be a contiguous block of data storage even where, for example, it can be embodied via multiple extents of one or more real disks, multiple real groups of hardware nodes, multiple real clusters of hardware nodes, multiple geographic locations, etc. For a given real cluster, e.g., real RAIN, that is N real nodes wide, M real disks deep, and L real extents high, a doubly mapped cluster, e.g., a doubly mapped RAIN, can consist of up to N' mapped nodes that each manage up to M' mapped disks employing as many as M'×L' real extents, e.g., a doubly mapped RAIN can store data on up to N×M×L extents of a real cluster, although it can be common that the real cluster can support multiple doubly mapped RAINs that can each use fewer than the total number of extents of the real cluster wherein the sum of the participating extents supporting all of the multiple doubly mapped RAINs does not exceed the total number of extents of the real cluster. Accordingly, in an embodiment, one example doubly mapped node of size X can comprise mapped disks corresponding to one or more real extents of one or more real disks of one or more real nodes of one or more real clusters, wherein the size of available storage space of the one or more real clusters is greater than or equal to X. Similarly, in an embodiment, extents of one or more real disks of one real nodes of one or more real clusters can be readily be managed by mapped nodes of one or more doubly mapped clusters.

Accordingly, in an embodiment, one doubly mapped disk can be expected to manage mapped extents constituted from different real disks of real nodes of one or more real clusters. Similarly, in an embodiment, portions of real disks of one real node can be expected to be managed by doubly mapped disks of one or more mapped RAIN clusters. In some embodiments, a doubly mapped cluster can be forbidden from using two real disks of one real node, can be forbidden from using two real extents of one real disk, etc., which can harden the mapped RAIN cluster against a failure of a real node, a real disk, etc., that may otherwise compromise stored data. Hereinafter, a portion of a real disk can be comprised in a real node that can be comprised in a real cluster and, furthermore, a portion of the real disk can correspond to a portion of a mapped disk, a doubly mapped disk can comprise one or more extents of one or more real disks, a doubly mapped node can comprise one or more disks of one or more real nodes, a doubly mapped cluster can comprise one or more nodes of one or more real clusters, etc., and, for convenience, the term RAIN can be omitted for brevity, e.g., a doubly mapped RAIN cluster can be referred to simply as a doubly mapped cluster, a doubly mapped RAIN node can simply be referred to as a doubly mapped node, a doubly mapped RAIN disk can be referred to simply as a doubly mapped disk, etc., wherein 'doubly mapped' is intended to convey that the doubly mapped disk/node/cluster/etc., is an abstraction of real storage space that is distinct from a real node and the corresponding real physical hardware component(s) of the real node, e.g., while data is actually storage on a real cluster/node/disk/extent, the data storage can abstracted to appear as being stored in a mapped cluster/node/disk/extent such that one or more mapped cluster/node/disk/extent can be 'built on top' of a real cluster/node/disk/extent. As an example, a data storage customer can use a doubly mapped cluster for data storage whereby the storage data is actually stored in various real data storage locations of a real data storage system, e.g., a real cluster, etc., according to a logical mapping between the real cluster and the doubly mapped cluster. This example can enable the doubly mapped cluster to have more granular data storage than in conventional allocation of storage space from real clusters.

In some embodiments, a rule can be employed in allocating a doubly mapped cluster. As an example, according to a data loss protection rule, etc., a doubly mapped cluster can be prohibited where it would employ two extents of one real disk in different mapped disks of one doubly mapped RAIN, e.g., this can protect against loss of one real disk from affecting two mapped disks of a doubly mapped RAIN. In this example, where a first mapped disk can store data and a second mapped disk can store protection data for the stored data of the first mapped disk, then loss of both the first and second mapped disk can result in a data loss event and, accordingly, it can be a best practice to prohibit doubly mapped clusters that risk this type of data loss exposure via employing two extents of one real disk in different mapped disks of one doubly mapped RAIN. As another example, according to another data loss protection rule, etc., a doubly mapped cluster can be prohibited where it would employ two real disks of one real node in different mapped nodes of one doubly mapped RAIN, e.g., this can protect against loss of one real node from affecting two mapped disks of a doubly mapped RAIN. In this example, where a first mapped disk can store data and a second mapped disk can store protection data for the stored data of the first mapped disk, then loss of both the first and second mapped disk can result in a data loss event and, accordingly, it can be a best practice to prohibit doubly mapped clusters that risk this type of data loss exposure via employing two real disks of one real node in different mapped disks of one doubly mapped RAIN. In other embodiments, a data loss protection rule can correspond to other mapped cluster schema to offer protection against the loss of more or less mapped nodes, e.g., in some embodiments where the mapped cluster redundancy is designed to withstand a loss of two mapped nodes, the related data loss protection rule can allow for one real node to support mapped disks from two mapped nodes of the same mapped cluster. It is noted that all such data loss protection rules are considered within the scope of the present disclosure even where not explicitly recited for the sake of clarity and brevity.

In an embodiment, storage of data via a mapped cluster can be via a real cluster, e.g., the mapped cluster can be of size N' mapped nodes by M' mapped disks each comprising up to L' mapped extents, and the real cluster can be N real nodes by M real disks comprising up to L extents per real disk in size, where N'=N, M'=M, and L'=L. In other embodiments, N' can be less than, or equal to, N, M' can be less than, or equal to, M, and/or L' can be less than, or equal to, L. It will be noted that in some embodiments, M' can be larger than M, e.g., where the mapping of a M real disks into M' mapped disks portions comprises use of a part of one of the M disks, for example, 10 real disks (M=10) can be mapped to 17 mapped disk portions (M'=17), can be mapped to 11 mapped disk portions (M'=11), can be mapped to 119 mapped disk portions (M'=119), etc. It will be further noted that in some embodiments, L' can be larger than L, e.g., where a mapped disk comprises $L(1)'+L(2)' \ldots +L(M)'$ extents, for example, extents of two mapped nodes (N=2), each of 10 real disks (M=10), wherein each real disk comprises 12 extents (L=12), for a total of 240 real extents, can be mapped to an example mapped cluster having a mapped disk comprised of 18 real extents, e.g., one extent from each of nine real disks of the first real node and each of nine real disks of the second real node; ten extents of one real disk of the first real node and nine extents of another real disk of the second real node; ten extents of one real disk of the first real node and one extent of each of nine real disks of the second real node; etc. Numerous other permutations are possible in assigning extents of real disks to support mapped disks/nodes/clusters and all such permutations, combinations, etc., are within the scope of the subject disclosure even where not explicitly recited for the sake of clarity and brevity.

In some embodiments, the doubly mapped cluster can be smaller than the real cluster. Moreover, where the doubly mapped cluster is sufficiently small in comparison to the real cluster, the real cluster can accommodate one or more additional doubly mapped clusters. In an aspect, where doubly mapped clusters are smaller than a real cluster, the doubly mapped cluster can provide finer granularity of the data storage system. As an example, where the real cluster is 8×8×8, e.g., 8 real nodes by 8 real disks by 8 extents per real disk, then, for example, four doubly mapped 4×4×8 clusters can be provided, wherein each of the four doubly mapped 4×4×8 clusters is approximately ¼th the size of the real cluster. As a second example, given an 8×8×8 real cluster 64 doubly mapped 2×2×2 clusters can be provided where each doubly mapped cluster is approximately ¹⁄₆₄th the size of the real cluster. As a third example, for the 8×8×2 real cluster, 2 doubly mapped 4×8×2 or 8×4×2 clusters can be provided and each can be approximately ½ the size of the real cluster. Additionally, the example 8×8×8 or 8×8×2 real cluster can provide a mix of different sized doubly mapped clusters, for example one 8×4×8 doubly mapped cluster, one 4×4×8 doubly mapped cluster, and four 2×2×8 doubly mapped clusters; etc. In some embodiments, not all of the real cluster must be comprised in one or more doubly mapped cluster(s), e.g., an example 8×8×8 real cluster can comprise only one 2×4×2 doubly mapped cluster with the rest of the real cluster not (yet) being allocated into doubly mapped storage space. In a further aspect, L for each of the M disks ban be, but need not be, the same value, e.g., real disk 1 can be 10 extents, e.g., L(1)=10, real disk 2 can be 12 extents, e.g., L(2)=12, real disk 3 can be 10 extents, e.g., L(3)=10, real disk 4 can be 1 extent, e.g., L(4)=1, etc. Moreover, the different disks can be the same or different size, e.g., disk 1 can be 128 megabytes (MB), disk 2 can be 512 MB, disk 3 can be 1 terabyte (TB), etc. Similarly, different real nodes can be of the same or different sizes.

A doubly mapped RAIN can, in some embodiments, comprise a processor, a virtual processor executing on a real processor, a combination of real processors and virtual processors, etc., that can enable interaction with data "stored in a doubly mapped cluster," e.g., a data representation corresponding to real data stored on one or more real clusters. The data stored in a doubly mapped cluster can actually correspond to real data stored on an extent of extents of a disk of a node of a real cluster, but can be interacted with according to a logical relation, e.g., to a representation said to be 'stored in the doubly mapped cluster.' As such, writing data into a logical address of the doubly mapped cluster can result in writing of the data into a physical data storage element addressed in the real cluster and an association between the doubly mapped cluster address and the real cluster address can be retained to allow other operations with the data, e.g., via operations directed to the logical representation but performed on the real data. In an aspect, the retention of the real-to-mapped address relationship, e.g., doubly mapped data corresponding to the real data, etc., can be via nearly any technique, for example, via a mapping table, via a data structure, etc., and all such techniques are within the scope of the present disclosure. Additionally, the relationship is typically updatable, allowing, for example, movement of data at the real cluster to still relate to an unchanged doubly mapped address, allowing movement of the doubly mapped data to still relate to unmoved data at the real address, etc. As an example, where a node of a real cluster fails, the relationship to the doubly mapped address can be updated to associate a redundant duplicate of the data of the real cluster to be associated with the doubly mapped address, thereby allowing a user of the doubly mapped cluster to operate on the data without disturbance. As another example, moving data in a doubly mapped cluster environment can be decoupled from actually moving the data within the real cluster, e.g., the updated doubly mapped address can be affiliated with the unchanged real address, etc. As a further example, a failure of a doubly mapped node, which is not related to a failure of a real node, can be compensated for by providing access to the real data at the unhanged real cluster address via a redundant doubly mapped cluster node. Numerous other examples of doubly mapped RAIN technology are readily appreciable and are considered within the scope of the present disclosure even where not recited for clarity and brevity.

An affinity metric can be employed, in some embodiments, to guide mapping between portions of a real cluster and a doubly mapped cluster. An affinity metric can reflect a distribution of doubly mapped cluster portions in a real cluster. As an example, in an 8×8×8 real cluster supporting a 4×4×2 doubly mapped cluster, the 32 mapped extents of the 16 mapped disks of the 4×4×2 doubly mapped cluster can be distributed in different manners within the 8×8×8 real cluster, for example, in two extents of each of the eight real disks of each of two real nodes, in one extent of each of eight real disks of each of four real nodes, etc. In this example, each of the different distributions can be associated with a corresponding affinity score that can reflect the distribution of stored data across the real cluster for that particular distribution topology. As such, for example, mapping of the 4×4×2 doubly mapped cluster into the 8×8×8 real cluster as 2 extents of 8 real disks of each of two real nodes can be associated with a first affinity score because all of the data of the doubly mapped cluster can be distributed across just two of the possible 8 real nodes, e.g., there is affinity between relatively few of the real nodes for the 4×4×2 doubly mapped cluster. Similarly, mapping of the 4×4×2 doubly mapped cluster into the 8×8×8 real cluster as one extent of each of eight real disks of each of four real nodes can be associated with a second affinity score, that can be different from the first affinity score, because all of the data of the doubly mapped cluster can be distributed across all more of the possible 8 real nodes, e.g., there is affinity between all of the real nodes for the 4×4×2 doubly mapped cluster.

In an aspect, affinity reflecting broader distribution of doubly mapped cluster data across a real cluster can be associated with higher availability of the data stored in the doubly mapped cluster. If data is broadly distributed, there can be loss of access to less data, e.g., more data remains accessible, in the event of the loss of a real node and/or real disk of the real cluster. This can be appreciated in the preceding example, whereby in the mapping of the 4×4×2 mapped cluster into the 8×8×8 real cluster as two extents in each of eight real disks of each of two real nodes can result in reduced access to data stored in the extents of eight reals disks if there is a loss of just one of the two real nodes, e.g., 16 extents of data compromised in this distribution. This is in contrast to a reduced access to data stored in just one extent of each of eight real disks for the loss of one real node where the mapping of the 4×4×2 doubly mapped cluster into the 8×8×8 real cluster was by one extent of each of eight real disks of each of four real nodes, e.g., eight extents of data compromised in this distribution. Moreover, even where data redundancy of the doubly mapped cluster can enable recovery of data stored in a less accessible real node and/or real disk, a broader distribution can correspondingly spread a recovery task across a greater number of real nodes and/or real disks. As an example, recovery of one lost node in the mapping of the 4×4×2 doubly mapped cluster into the 8×8×8 real cluster as two extents of eight real disks of each of two real nodes can result in an attempt to rebuild the data stored on less accessible real node based on the data stored on the remaining accessible real node, which can put a high demand on the processor of the remaining accessible real node. This example can be contrasted with another example that can attempt to recover one lost node in the mapping of the 4×4×2 doubly mapped cluster into the 8×8×8 real cluster as one extent of each of eight real disks of each of four real nodes can result, which can accordingly burden processors of the three other accessible real nodes, e.g., recovering less data by more resources than the preceding example. Paraphrasing the above examples, a lower affinity score can correspond to data being stored by fewer real nodes, which can, in turn, increase an amount of less accessible data should a real node becomes less accessible, and can also be associated with a higher computer resource burden during a recovery from a real node becoming less accessible than can be experienced where data is more broadly distributed across real extents of real disks of real nodes of a real cluster.

In some embodiments, other metrics can also be employed in conjunction with an affinity metric to guide storage of data of a mapped cluster in a real cluster. As an example, a first real node of a real cluster can comprise older hardware that may not perform as quickly, reliably, etc., as newer hardware of a second real node of the real cluster, e.g., which can be indicated in key performance indicator data for real node hardware, etc., whereby it can be desirable to both widely distribute the data storage, e.g., a high affinity score, thereby gaining the aforementioned benefits, but can also be desirable to more heavily burden the second real node based on the better performance in contrast to the first real node. The affinity score can be employed in conjunction with the example difference in performance to achieve a different distribution than may be achieved with strictly the affinity score or strictly the performance information. Moreover, the affinity metric and/or the other metrics can be weighted to adjust the level of influence they assert in determining a distribution of data from a mapped cluster into a real cluster.

Other metrics can include, processor factors such as count, speed, etc., memory factors such as an amount of memory, speed, throughput, etc., network factors such as bandwidth, cost, latency, reliability, etc., location, reliability, monetary cost, geopolitical factors, etc. Moreover, other aspects of the disclosed subject matter provide additional features generally not associated with real cluster data storage. In some embodiments, a doubly mapped cluster can comprise storage space from more than one real cluster. In some embodiments, a doubly mapped cluster can comprise storage space from real nodes in different geographical areas. In some embodiments, a doubly mapped cluster can comprise storage space from more than one real cluster in more than one geographic location. As an example, a doubly mapped cluster can comprise storage space from a cluster having hardware nodes in a data center in Denver. In a second example, a doubly mapped cluster can comprise storage space from a first cluster having hardware nodes in a first data center in Denver and from a second cluster also having hardware nodes in the first data center in Denver. As a further example, a doubly mapped cluster can comprise storage space from both a cluster having hardware nodes in a first data center in Denver and a second data center in Denver. As a still further example, a doubly mapped cluster can comprise storage space from a first cluster having hardware nodes in a first data center in Seattle, Wash., and a second data center having hardware nodes in Tacoma, Wash. As yet another example, a doubly mapped cluster can comprise storage space from a first cluster having hardware nodes in a first data center in Houston, Tex., and a second cluster having hardware nods in a data center in Mosco, Russia. Accordingly, in regards to affinity and/or other metrics, in an example, a real cluster can comprise data storage in a first data center located in Seattle, which can be subject to earthquakes, frequent violent political events, etc., and in a second data center located in Spokane, which can be less prone to earthquakes and political events, whereby spreading data, based on an affinity metric and other metrics, e.g., risks form earthquake and riots, can slightly favor a higher ratio of data storage in real nodes of the Spokane portion of the real cluster, e.g., more of the total data can be stored in Spokane than in Seattle because it can be less at risk while still spreading the data storage across real nodes located in both Seattle and Spokane. Numerous other examples are to be readily appreciated by one of skill in the art, and all such examples are considered within the scope of the present disclosure, even where not recited for the sake of clarity and brevity.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100, which can facilitate affinity sensitive data storage at a real node of a doubly mapped RAIN storage system, in accordance with aspects of the subject disclosure. System 100 can comprise a cluster storage construct 102, which can be embodied in a cluster storage system. In an embodiment, cluster storage construct 102 can be embodied in a real cluster storage system comprising one or more hardware nodes that each comprise one or more storage devices, e.g., hard disks, optical storage, solid state storage, etc. Moreover, each real storage device can comprise one or more extents. An extent can be a defined portion of the real storage device, e.g., a real disk can be logically divided into extents, and the extents can comprise data storage locations that can facilitate data operations according to the storage locations. It is noted that a disk of a stated size can typically comprise less than the stated size of useable storage, a common convention, wherein a portion of the stated size is generally reserved for operational overhead, e.g., a 4 TB drive may have less than 4 TB of useable storage where the drive uses a portion of the 4 TB for a basic input output system (BIOS), etc. Accordingly, the extents of a disk can also differ from the stated size for similar reasons. In an aspect, extents can be of a unit size, for example, an extent can be 500 gigabytes (GB), such that a 5 terabyte (TB) disk can comprise 10 extents and an 8 TB disk can comprise 16 extents, again, as noted herein, the extents may not be exactly 500 GB due to some of the stated disk space being otherwise allocated, but the extents can be of the same unit size. As is noted hereinabove, in some embodiments, extents can be of other than a unit size without departing form the scope of the subject disclosure even where not discussed in more detail herein for the sake of clarity and brevity. Use of unit sized and/or non-unit sized extents, in some embodiments, can enable a real cluster to support doubly mapped clusters corresponding to extents of real disks, rather than whole real disks, wherein the doubly mapped cluster can employ part of a real disk, e.g., can correspond to part of the real disk. Moreover, an extent unit size can enable use of different sized real disks in the real cluster without complicating allocation of storage space in the doubly mapped cluster. As an example, in a singly mapped cluster, whole real disks can be mapped, e.g., a mapped disk can correspond to a whole real disk and, accordingly, it can be more complex to allocate a mapped cluster based on a real cluster having mixed disk sizes, for example, because this can result in different sizes of mapped disks that can complicate redundant data storage in the mapped cluster construct. In contrast, different sizes of real disks in a real cluster with doubly mapped cluster technology is immaterial because the doubly mapped cluster can map equal sized extents and redundant data storage can therefore be less complex. As an example, if a real node comprises a 1 TB drive and an 8 TB drive, then a mapped node can comprise a 1 TB mapped drive and an 8 TB mapped drive which can complicate redundant storage because loss of one of the mapped drives can result in data loss unless more complex redundant data storage techniques are employed to preserve data in case of a lost mapped drive. In this example, if doubly mapped cluster technology is employed with a 1 TB extent size, then there can be 9 extents in the real drives and a doubly mapped cluster can comprise two four extent doubly mapped disks allowing for less complex data redundant storage techniques to be employed. Additionally, for this example, the granular size is 9 TB in the singly mapped cluster, and can be as low as 2 TB in the doubly mapped cluster.

In system 100, cluster storage construct 102 can receive data for storage in a mapped cluster, e.g., data for storage in RAIN cluster storage system 104, etc., hereinafter data 104 for brevity. Data 104 can be stored by portions of the one or more storage devices of cluster storage construct 102 according to a logical mapping of the storage space, e.g., according to one or more doubly mapped clusters. In an aspect, a doubly mapped cluster can be a logical allocation of storage space comprised in cluster storage construct 102. In an embodiment, a portion, e.g., addressable storage element, of an extent of a real disk can be comprised in an extent of a real disk that can be comprised in a real node that can be comprised in a real cluster and, furthermore, an addressable storage element of the real cluster can correspond to a portion of a doubly mapped cluster, etc. Accordingly, in an embodiment, cluster storage construct 102 can support a doubly mapped cluster enabling data 104 to be stored on one or more addressable storage element of an extent, e.g., first extent component 150 through L-th extent 158, of a real disk, e.g., first disk 130 through M-th disk component 138 of a real cluster, e.g., first cluster node component 120 through N-th cluster node component 128 of a cluster storage component (CSC), e.g., first CSC 110 through P-th CSC 118, and correspond to a doubly mapped cluster schema. Whereas each disk comprises extents, e.g., first disk component 130 comprises first extent component 150 through L-th extent component 158, first disk component 140 comprises first extent component 160 through L-th extent component 168, etc., the total number of extents of cluster storage construct 102 can be determined by summing the number of extents in each disk of each node of each cluster for all clusters, nodes, and disks, e.g., for a single cluster system, an 8×8×8 cluster can have 512 extents of a determined size. In an aspect, a mapped cluster control component, e.g., mapped cluster control component 220, etc., can coordinate storage of data 104 on storage elements of a real cluster of cluster storage construct 102 according to relationships between the mapped data storage space and the real data storage space, e.g., mapped cluster control component 220, etc., can indicate where in cluster storage construct 102 data 104 is to be stored, cause data 104 to be stored at a location in cluster storage construct 102 based on a mapping of the mapped cluster, etc.

In an embodiment, a doubly mapped cluster built on top of cluster storage construct 102 can correspond to one or more portions of one or more real cluster, e.g., to a portion of an extent of one or more disks of one or more nodes of one or more real clusters. Moreover, the mapped cluster can be N' nodes by M' disks by L' extents in size and the one or more real clusters of cluster storage construct 102 can be N nodes by M disks by L extents in size.

In some embodiments, a doubly mapped cluster can correspond to storage space from more than one real cluster, e.g., first CSC 110 through P-th CSC 118 of cluster storage construct 102. In some embodiments, a doubly mapped cluster can correspond to storage space from real nodes in different geographical areas. In some embodiments, a doubly mapped cluster can correspond to storage space from more than one real cluster in more than one geographic location. As an example, a doubly mapped cluster can correspond to storage space from a cluster having hardware nodes in a data center in Denver, e.g., where first CSC 110 is embodied in hardware of a Denver data center. In a second example, a doubly mapped cluster can correspond to storage space from a first cluster having hardware nodes in a first data center in Denver and from a second cluster also having hardware nodes in the first data center in Denver e.g., where first CSC 110 and P-th CSC 118 are embodied in hardware of a Denver data center. As a further example, a doubly mapped cluster can correspond to storage space from both a cluster having hardware nodes in a first data center in Denver and a second data center in Denver e.g., where first CSC 110 is embodied in first hardware of a first Denver data center and where P-th CSC 118 is embodied in second hardware of a second Denver data center. As a further example, a doubly mapped cluster can correspond to storage space from a first cluster having hardware nodes in a first data center in Seattle, Wash., and a second data center having hardware nodes in Tacoma, Wash., e.g., where first CSC 110 is embodied in first hardware of a first Seattle data center and where P-th CSC 118 is embodied in second hardware of a second Tacoma data center. As another example, a doubly mapped cluster can correspond to storage space from a first cluster having hardware nodes in a first data center in Houston, Tex., and a second cluster having hardware nods in a data center in Mosco, Russia e.g., where first CSC 110 is embodied in first hardware of a first Houston data center and where P-th CSC 118 is embodied in second hardware of a second Mosco data center.

In an aspect, a mapped cluster control component, e.g., 220, etc., can allocate storage space of cluster storage component 102 based on an indicated level of granularity. In an aspect, this indicated level of granularity can be determined based on an amount of data to store, a determined level of storage space efficiency for storing data 104, a customer/subscriber agreement criterion, an amount of storage in cluster storage construct 102, network/computing resource costs, wherein costs can be monetary costs, heat costs, energy costs, maintenance costs, equipment costs, real property/rental/lease cost, or nearly any other costs. In an aspect, these types of information can be termed 'supplemental information', e.g., 222, etc., and said supplemental information can be used to allocate mapped storage space in a doubly mapped cluster and the corresponding space in a real cluster storage construct 102. In some embodiments, allocation can be unconstrained, e.g., any space of cluster storage component 102 can be allocated into a doubly mapped cluster. In other embodiments, constraints can be applied, e.g., a constraint can be employed by a doubly mapped cluster control component to select or reject the use of some storage space of cluster storage construct 102 when allocating a doubly mapped cluster. As an example, a first constraint can restrict allocating two doubly mapped clusters that each use a disk from the same real node because difficulty accessing the real node can result in effects on two doubly mapped clusters, a second constraint can restrict allocating two doubly mapped disks of one doubly mapped cluster from using extents from the same real disk because difficulty accessing the real disk can result in effects on the two doubly mapped disks. Other constraints can be readily appreciated, for example, based on a type of data redundancy schema, based on available/use storage space, based on network/computing resource costs, etc., and all such constraints are within the scope of the instant disclosure even where not recited for clarity and brevity.

Figure 2:
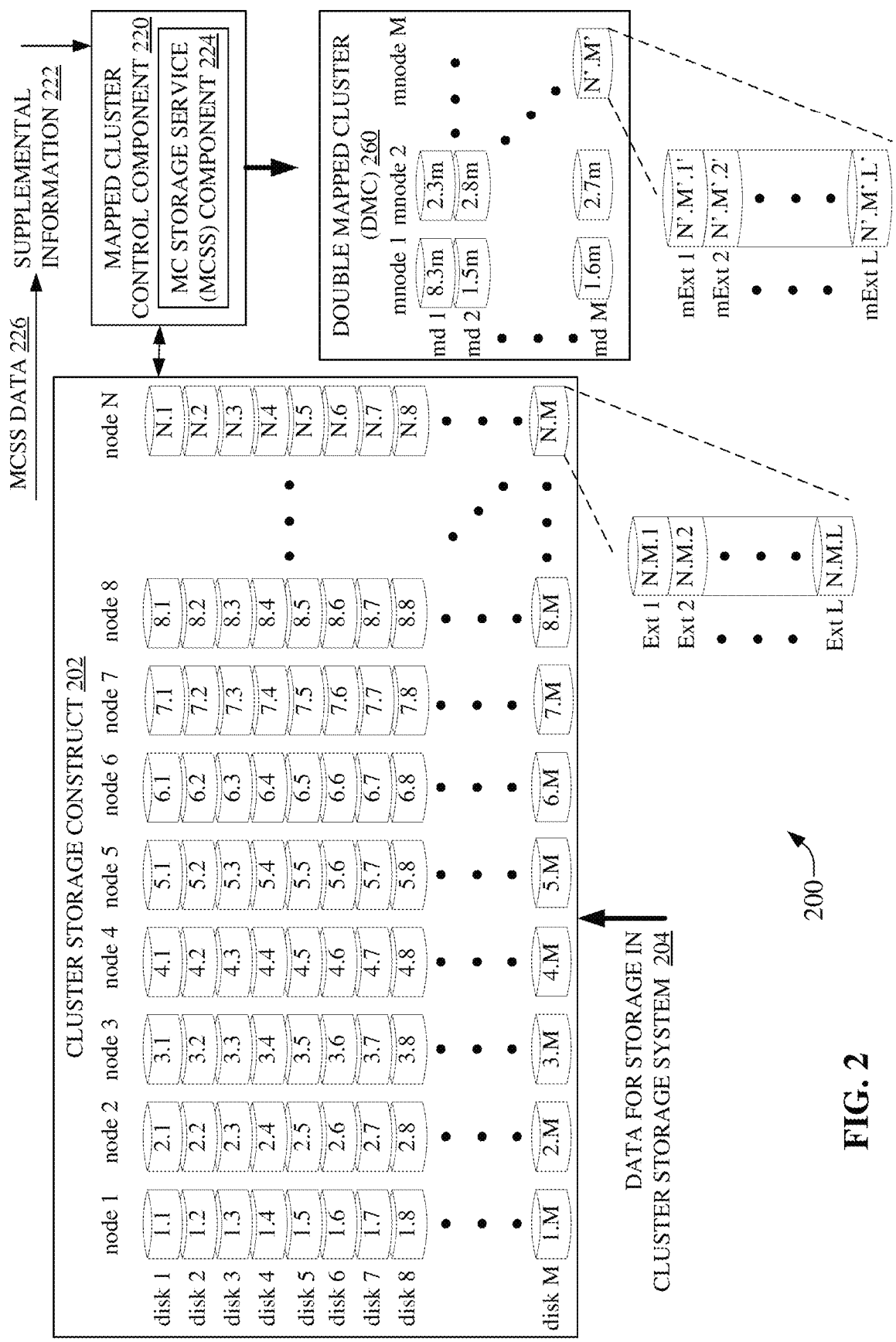
FIG. 2 is an illustration of an example system that can facilitate affinity sensitive data storage at a real node of a doubly mapped RAIN storage system based on a mapping of mapped extents to real disks, in accordance with aspects of the subject disclosure.

FIG. 2 is an illustration of a system 100, which can facilitate affinity sensitive data storage at a real node of a doubly mapped RAIN storage system based on a mapping of mapped extents to real disks, in accordance with aspects of the subject disclosure. System 200 can comprise cluster storage construct 202 that can be the same as, or similar to, cluster storage construct 102. Cluster storage construct 202 is illustrated at the disk and node-level for ease of illustration, e.g., disk 1.1 indicates disk 1 of node 1. As used herein, the disk, node, and extent can be typically depicted as N.M.L in real components, N'.M'.L' in mapped components, etc., such that, for example, data stored at 1.1.1 is stored at an addressable storage location of real node 1, real disk 1, real extent 1, data stored at 4'.3'.8' is stored "at" an addressable storage location corresponding to mapped node 4, mapped disk 3, mapped extent 8, etc. As is illustrated in system 200, cluster storage construct 202 can comprise N nodes of M disks, e.g., disk 1.1 to N.M, etc. Moreover, each of the M disks of the N nodes can comprise L extents, see the flyout of disk N.M of cluster storage construct 202 that comprises L extents, e.g., N.M.1 through N.M.L.

Mapped cluster control component 220 can be communicatively coupled to, or be included in, cluster storage construct 202. Mapped cluster control component 220 can allocate doubly mapped cluster (DMC) 260, which can logically embody storage comprised in cluster storage construct 202. In an embodiment, DMC 260 can be allocated based on supplemental information 222. As an example, supplemental information 222 can indicate a first amount of storage is needed and mapped cluster control component 220 can determine a number of, and identity of, extents of disks of nodes of cluster storage construct 202 to meet the first amount of storage. Mapped cluster control component 220, in this example, can accordingly allocate the identified extents, disks, and nodes of cluster storage construct 202 as corresponding to doubly mapped nodes (mnode, mn, etc.), disks (mdisk, md, etc.), and extents (mextent, mExt, etc.) of DMC 260, e.g., extents of disk 8.3m can correlate to an allocation of extents of disk 8.3, . . . , extents of disk N'.M' can correlate to an allocation of disk N.M, etc. As such, similar to a real cluster, e.g., cluster storage construct 202, etc., DMC 260 can comprise mapped extents, for example, see flyout of doubly mapped disk N'.M' comprising mapped extents mExt 1 through mExt L, e.g., N'.M'.1' through N'.M'.L'.

In an aspect, mapped cluster control component 220 can comprise mapped cluster storage service (MCSS) component 224 that can cause an instance of a storage service to be instantiated. The storage service can enable interaction with data stored via a mapped disk of a mapped node, e.g., writing, reading, modifying, moving, copying, duplicating, deleting, freeing, etc., of data in a mapped cluster abstraction can be performed on data of a real disk of a real node of a real cluster via an instance of a storage service. Instantiation of the storage service for DMC 260 can be based on data relating to a topology of extents serving DMC 260, affinity data, computing resource data, etc., as is disclosed elsewhere herein, which can be embodied in MCSS data 226 that can be comprised in supplemental information 222. In some embodiments, MCSS component 224 can be comprised in other components of system 200, other components of a storage system comprising system 200, etc., and can correspondingly receive MCSS data 226 appropriately, e.g., not comprised in supplemental information 222, etc.

Mapped cluster control component 220 can facilitate storage of data 204, corresponding to data representations of DMC 260, in the allocated storage areas of cluster storage construct 202. As such, data 204 can be stored in a more granular storage space than would conventionally be available, e.g., conventionally all disks of a node can be committed to storage, e.g., a client device is conventionally 'given' a whole real node to use, even where the 1 to M disks available in the whole real node can far exceed an amount of storage space needed by the client device. As such, by mapping portions of extents of some disks from some nodes into DMC 260, a lesser amount of storage space can be made available to the client device, for example, rather than allocating a whole real node under conventional technology, with doubly mapped RAIN technology a single extent of a single disk of a single node can be allocated, which can be significantly less storage space than the whole node. As an example, where a conventional storage cluster can allocate a minimum block of 1.2 petabytes (PB), for example in a conventional ECS storage system 1.2 PB can be the minimum storage size, this can far exceed demands of a client device in many situations. Continuing the example, a singly mapped RAIN can allocate at a whole disk-level and can reduce the minimum storage size considerably. Still further in the example, doubly mapped RAIN can allocate storage at the extent level to provide still further granularity of storage space and reduce the minimum allocated space even beyond singly mapped RAIN technology. As an example, where storage can be related to storing a simple log file, storing the log file in 1.2 PB of space can be extremely inefficient use of space. Similarly, in this example, even storing the log file in several TB of disk space can be highly inefficient use of storage space. As such, allocation of storage space at the disk extent level can provide levels of granularity that are much more storage space efficient.

Figure 3:
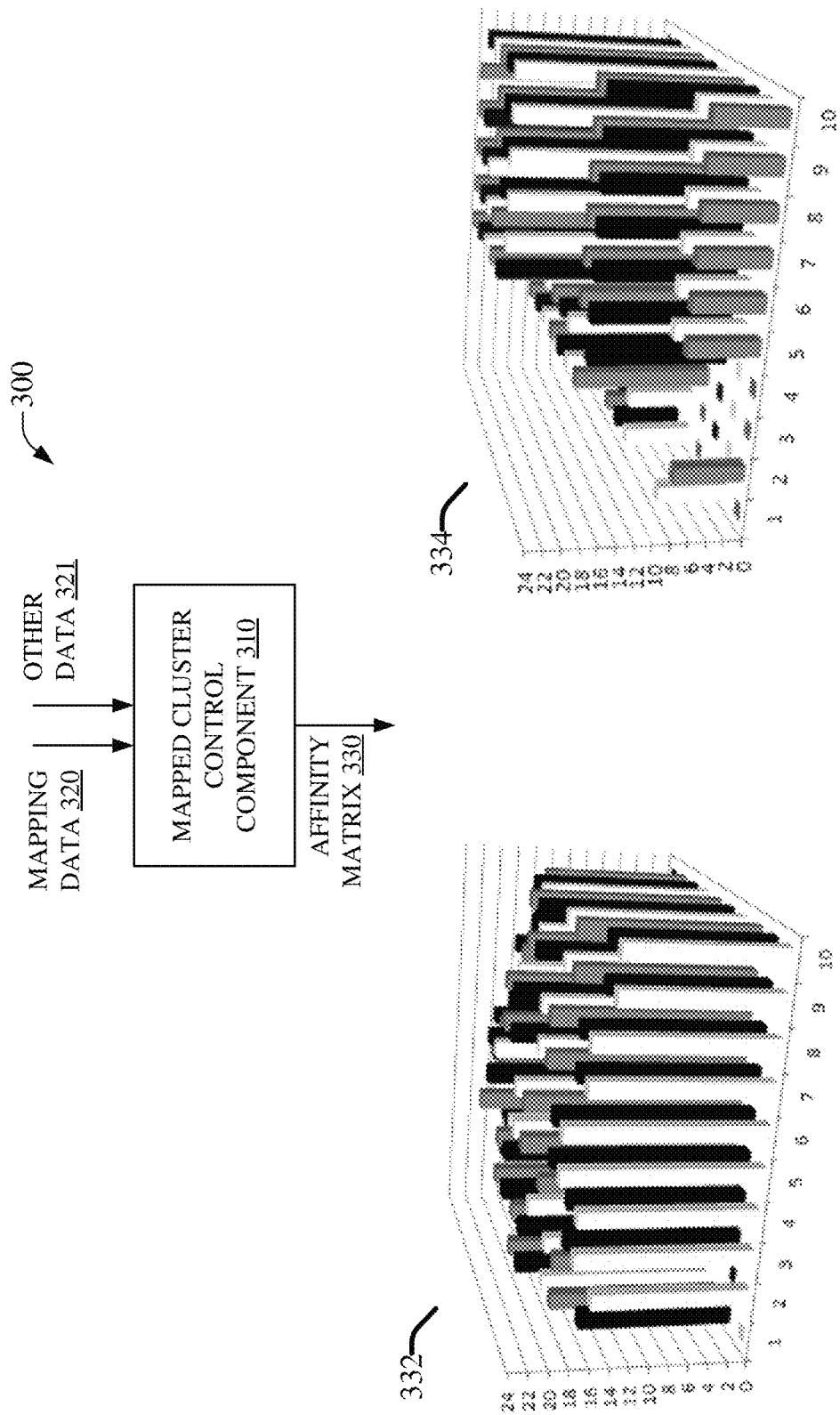
FIG. 3 is an illustration of an example system that can enable determining an affinity matrix facilitating affinity sensitive data storage distribution of data across real storage devices, in accordance with aspects of the subject disclosure.

FIG. 3 is an illustration of a system 300, which can facilitate determining an affinity matrix facilitating affinity sensitive data storage distribution of data across real storage devices, in accordance with aspects of the subject disclosure. System 300 can comprise mapped cluster control component 310. Mapped cluster control component 310 can receive mapping data 320 and can facilitate doubly mapped clusters, e.g., DMC 260, etc. Mapped cluster control component 310 can also receive other data 321 that can also facilitate mapping doubly mapped clusters, for example, a mapping rule(s), a mapping scheme, a real disk/real node/real cluster selection criterion, etc. In an aspect, mapped cluster component 310 can generate, maintain, adapt, delete, release, etc., doubly mapped clusters based on mapping data 320, other data 321, etc.

In an aspect, mapped cluster control component 310 can generate an affinity matrix 330, e.g., a representation of values comprised in example affinity matrices can be, for example, affinity plot 332, 334, etc. An affinity plot can illustrate affinity values from an N×N affinity matrix 330, for example, plot 332 is 10×10 with values plotted in the vertical, e.g., ranging from 0 to 24, plot 334 is 10×10 also with values again plotted in the vertical. In some embodiments, an affinity plot can illustrate affinity values from an N×N affinity matrix and comprise affinity data for extents of disks contributing to the corresponding doubly mapped cluster, not illustrated in FIG. 3.

An affinity between real nodes can be based on a count of real disks participating in a mapped cluster. A higher affinity score can indicate that a real node comprises real disks participating in more mapped clusters than a real node with a lower affinity score, e.g., the real node can increase an affinity score by having disks participating in more mapped nodes and thereby having an affinity with more other real nodes. In this way, if the real node fails, a greater number of other real nodes can participate in recovery of data of the failed real node to another node, and in turn, this can result in a shorter duration of recovery where the task of recovery is spread across the computer resources of more real nodes. Recovery can be to available real disks of nodes other than the lost node, e.g., to another real node of the portion, expanding the portion to include an additional real node as a substitute for the failed real node, etc. Where data is recovered in shorter times, a probability of multiple simultaneous node failures can be correspondingly reduced. As an example, if a 2×4 mapped cluster is mapped to a 4×2 real portion, the loss of one real node can result in recovery of data of two lost real disks in the lost real node, whereby the remaining three real nodes can participate in the recovery of the lost 2 real disk's data, e.g., each remaining node can be said to be apportioned recovery of $\frac{2}{3}$rds of a lost disk based on two disks being recovered by three nodes. If recovery of a lost disk is said to take 12 hours, then recovery of the two lost disks can take 8 hours for three remaining real nodes, e.g., $12*(\frac{2}{3})$. In contrast, where the example 2×4 mapped cluster is mapped to a 2×4 real portion, then the recovery of the lost 4 disks can be apportioned to the one remaining real node, resulting in a recovery time of 12 hours per disk for each of 4 lost disks, which equals 48 hours recovery. In the example mapping to a 4×2 portion, a loss of a further real node occurring at 24 hours after the first lost real node would be manageable because the data recovery from the first lost node would already have been recovered from after 8 hours, which is in noteworthy contrast to the mapping to the 2×4 portion, which can still be in the middle of recovering the data after 24 hours from the first loss, and the further loss of another real node can result in a data loss event. In an aspect, an affinity between real disks, as compared to real nodes, can be based on a count of real extents participating in a mapped disk of a mapped node of a mapped cluster. In this aspect, affinity between mapped disks can reflect a level of distribution among extents comprised in a doubly mapped cluster. This can be similar to an affinity between nodes, but at a disk-level. More even distribution of extents among disks can have similar benefits as more even distribution of disks among nodes.

Accordingly, it can be desirable to have higher affinity between real nodes, between real disks, etc., which can reflect broader distribution of data storage. In an aspect, an affinity matrix can be employed to assess distribution of storage in real disks of real nodes for corresponding doubly mapped clusters. An affinity matrix at a node-level can be a square N×N matrix, where N can be a number of real nodes in a real cluster. An affinity matrix at a disk-level can be a square NM×NM matrix, where M can be a number of real disks in each of the N nodes of a real cluster. A value $Y(i,j)$ in an affinity matrix can indicate a number of disks an $i^{th}$ real node and $j^{th}$ real node donate to a same mapped cluster. It will be noted that $X(i,i)=0$, and further noted that $X(i,j)=X(j,i)$. A value $X(i,j)$ in an affinity matrix can indicate a number of extents an $i^{th}$ real disk and $j^{th}$ real disk donate to a same mapped cluster. The greater the level of similarity in affinity values across an affinity matrix can indicate a more robust storage scheme, e.g., when values $X(i,j|i!)=j$ are more similar in a node affinity matrix, a disk affinity matrix, or a combination thereof, the storage scheme can generally be considered more robust than when the values are less similar. Similarly, the more even the affinity, generally the more accessible the stored data, that is, more data can be accessed even in the event of a real node and/or real disk becoming less accessible. Further, recovery of data from a less accessible real node and/or a less accessible real disk is also improved, as previously discussed, when the values are more similar in contrast to the values being less similar.

In this regard, affinity plot 332 at the node-level can illustrate more similarity, less deviation, etc., for affinity scores among real nodes in an N×N affinity matrix than those illustrated in affinity plot 334. Similarly, though not illustrated for clarity and brevity, an affinity plot at the disk-level, e.g., reflecting affinity of extents among disks of the doubly mapped cluster, can be employed to assess deviation among affinity scores at the disk-level within the node-level. This can enable assessing both node-level affinity and disk-level affinity for a doubly mapped cluster and, in an aspect, the discussion of the node-level affinity presented herein is reflected in the disk-level affinity. Affinity plot 332 can reflect a "good" node-level mapping of 8×8 Mapped RAIN 1 (see 'cross-hatched' area of 1100 in FIG. 11A corresponding to 1110 of FIG. 11B) and Mapped RAIN 2 (see 'vertical-hatched' area of 1100 in FIG. 11A corresponding to 1120 of FIG. 11C), with remaining areas not yet used for storage in the real cluster. Similarly, affinity plot 334 can reflect a "poor" mapping of Mapped RAIN 1 (see 'cross-hatched' area of 1200 in FIG. 12A corresponding to 1210 of FIG. 12B) and Mapped RAIN 2 (see 'vertical-hatched' area of 1200 in FIG. 12A corresponding to 1220 of FIG. 12C).

Visual comparison of affinity plot 332 to affinity plot 334 readily illustrates that affinity plot 332 is more evenly distributed and appears 'flatter' and that the affinity scores of a corresponding affinity matrix are generally all higher than for an affinity matrix corresponding to affinity plot 334. This flatness reflects that the mapping of mapped cluster disks to real cluster disks is more distributed among the real nodes of the real cluster, which can increase the accessibility of stored data, e.g., more data can be accessible in the event of a real node becoming less accessible, compromised data of the less accessible real node can be recovered more quickly and with more distribution of encumbered computer resources, etc., than for data storage reflected in affinity plot 334. Similarly, for a disk-level affinity plot, not illustrated, mapping of mapped cluster extents to real cluster extents can be more distributed among the real disks of the real cluster, which can similarly increase the accessibility of stored data, e.g., more data can be accessible in the event of a real disk becoming less accessible, compromised data of the less accessible real disk can be recovered more quickly and with more distribution of encumbered computer resources, etc., in a manner that can parallel node-level affinity analysis. In an embodiment, analysis of affinity scores, affinity matrixes, affinity plots, etc., can be employed in selected, ranking, scoring, etc., of mapping schema. As such, a mapping scheme that is determined to satisfy an affinity rule can be selected for use in storing data of a mapped cluster via a portion of a real cluster. As an example, a first affinity matrix 330 can be reflected in affinity plot 332 and a second affinity matrix 330 can be reflected in affinity plot 334. Where the first affinity matrix 330 has a flatter distribution of affinity scores than the second affinity matrix 330, as is illustrated in affinity plots 332 and 334, the mapping of mapped clusters can be performed according to a mapping scheme corresponding to the first affinity matrix 330.

In an aspect, system 300 can generate, store, compare, rank, score, etc., affinity matrixes to enable selection of a double mapping scheme. In some embodiments, other data 321 can comprise a previously computed affinity matrix(es). This can enable modeling of double mapping schema to be communicated to mapped cluster control component 310 to facilitate selection of a double mapping scheme that can have disk-level affinities and/or node-level affinities that can be determined to satisfy one or more affinity based selection rule(s). It will be noted that higher affinity and more even affinity can both be desirable, e.g., at both the disk-level and/or the node-level. As an example, a very flat affinity plot with low affinity values can reflect a less robust mapping scheme than a slightly more irregular affinity plot with much higher affinity scores. In general, the higher the affinity scores and the less deviation among the affinity scores the more robust the data stored according to a corresponding mapping scheme. A low deviation and low affinity score can, for example, occur in a real cluster that maps many small mapped clusters, e.g., each small mapped cluster may only map to a few real disks which can be well distributed resulting in low affinity scores that have low deviation. A high deviation and high affinity score can occur where a few large mapped clusters are mapped to a real cluster in a poorly distributed manner, e.g., some mapped clusters can be widely distributed in the real cluster and other mapped clusters can be narrowly distributed in the real cluster which can lead to high deviation with some very high affinity scores and some very low affinity scores. In an aspect, a rank or score of an affinity matrix can therefore reflect high affinity values and less distribution, e.g., where a higher rank is 'good', a rank of an affinity matrix can be incremented for low deviation, for a high affinity value, etc., and can be decremented for a high deviation, for a low affinity value, etc., enabling selection of a mapping scheme corresponding to a higher ranked affinity matrix which can result in a more robust mapping of data between mapped clusters and a real cluster.

Figure 4:
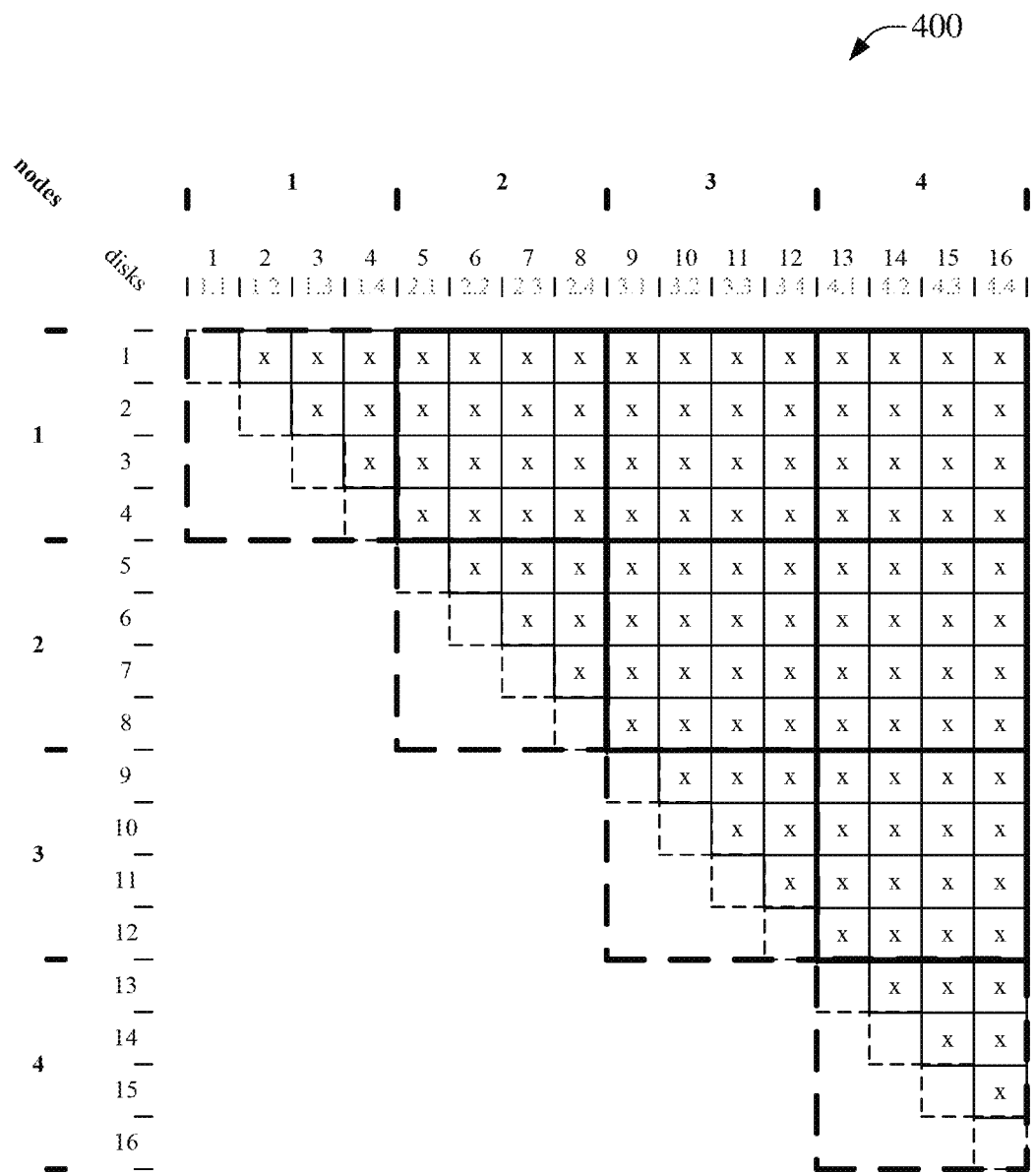
FIG. 4 is an illustration of an example disk and node affinity matrix facilitating affinity sensitive data storage distribution of data across real storage devices, in accordance with aspects of the subject disclosure.

FIG. 4 is an illustration of an example disk and node affinity matrix 400 facilitating affinity sensitive data storage distribution of data across real storage devices, in accordance with aspects of the subject disclosure. Matrix 400 can reflect both node-level and disk-level affinity values for a doubly mapped cluster. In matrix 400, elements framed with a dotted line contain zero values, null values, etc. Elements of matrix 400 framed with a thin line are elements of a disk affinity matrix, e.g., reflecting disk-level affinity between extents among disks of nodes of a doubly mapped cluster, and can have values indicated with the variable 'x'. Elements of matrix 400 framed with thick line are elements of a node affinity matrix, e.g., reflecting node-level affinity between disks among nodes of the doubly mapped cluster. Node-level affinity values can be termed 'y' where y is equal to the sum of x's in the node-level element. As an example, for the node-level element at [1,4], e.g., the upper right modes think lined element, then its value is a sum of all x's within the thick frame, e.g., Y[1,4] is the sum of all Xi,j, where 0<i<=4 and 12<j<=16.

As such, a double affinity matrix, or both a disk and node affinity matrix, can be used to assess a level of quality for a disposition of doubly mapped RAINs. A node affinity matrix can be a square matrix N×N, where N is a number of nodes in a real RAIN. A value Yi,j in a matrix indicates a number of disk extents ith and jth real nodes donate to same doubly mapped RAINs. Note that (a) Yi,i=0 and (b) Yi,j=Yj,i. When a mutual disposition of doubly mapped RAINs is 'good,' values Yi,j|i!=j are generally more similar, evenly distributed, etc. A disk affinity matrix can be a square matrix NM×NM, where M is a number of disks in a real node. A value Xi,j in a matrix indicates a number of disk extents ith and jth real disks donate to same doubly mapped RAINs. Note that (a) Xi,i=0 and (b) Xi,j=Xj,i. When a disposition of doubly mapped RAINs is 'good,' values Xi,j|i!=j are generally more similar, evenly distributed, etc. A node-level affinity matrix can comprise disk-level affinity values as demonstrated in example disk and node affinity matrix 400.

Figure 5:
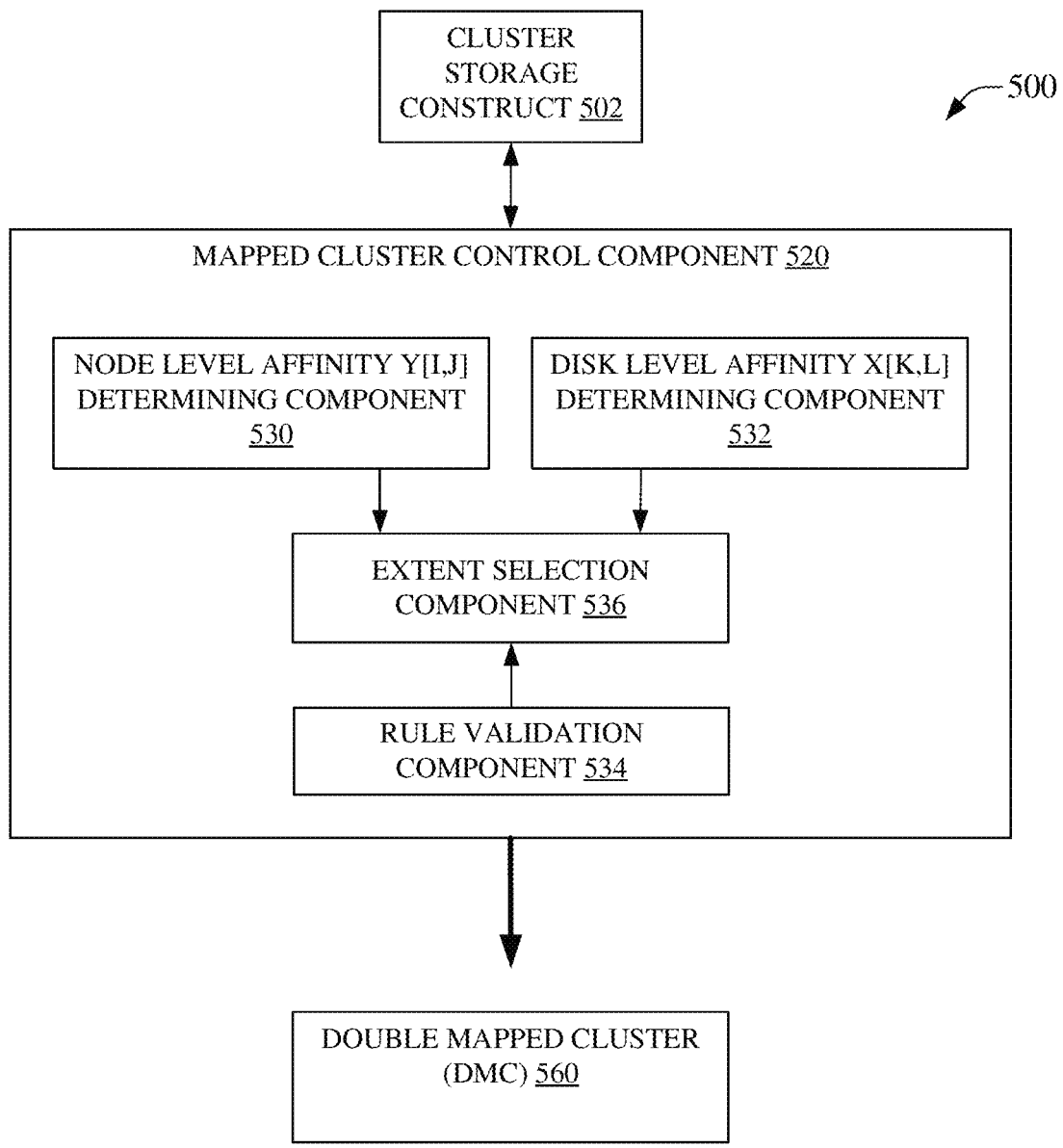
FIG. 5 is an illustration of an example system that can facilitate determining affinity matrixes supporting affinity sensitive data storage distribution of data across real storage devices, in accordance with aspects of the subject disclosure.

FIG. 5 is an illustration of example system 500 that can facilitate determining affinity matrixes supporting affinity sensitive data storage distribution of data across real storage devices. System 500 can comprise mapped cluster control component 520 that can be communicatively coupled to cluster storage construct 502. Mapped cluster control component 520 can control allocation of doubly mapped clusters, e.g., DMC 560, etc. In an aspect, allocation of DMCs can be affinity matrix/value sensitive, e.g., affinity matrixes can be employed to select disk extents/disks/nodes in a manner that provides the aforementioned benefits, e.g., higher data availability, faster recovery, less burdensome recovery, etc., in situations where a portion of the cluster storage construct 502 can become less accessible.

In an embodiment, mapped cluster control component 520 can comprise node-level and disk-level affinity determining components, e.g., component 530, 532, etc. In an aspect, node-level affinity determining component 530 can determine node-level affinity, e.g., Y[i,j] for mapped cluster of cluster storage construct 502. In another aspect, disk-level affinity determining component 532 can determine disk-level affinity, e.g., X[k,l] for a mapped cluster of cluster storage construct 502. In an aspect, Y[I,j] and X[k,l] can be determined at any stage of allocation of a DMC, e.g., for a new DMC, there can be zero affinity at both the node and disk-level; for a DMC in the process of being allocated, only previously allocated disks and nodes can contribute to an affinity matrix(es); for a fully allocated DMC, all allocated disks and nodes can be reflected in the corresponding affinity matrix(es); etc.

Mapped cluster control component 520, in some embodiments, can comprise rule validation component 534. Rule validation component 534 can validate that a J'th node and L'th disk comply with one or more rules, e.g., one or more data loss protection rules, etc. An example data loss protection rule can prohibit employing two extents of one real disk in different mapped disks of one doubly mapped RAIN to protect against loss of one real disk from affecting two mapped disks of a doubly mapped RAIN. As another example, another data loss protection rule can prohibit employing two real disks of one real node in different mapped nodes of one doubly mapped RAIN to protect against loss of one real node from affecting two mapped disks of a doubly mapped RAIN. In other embodiments, a data loss protection rule can correspond to other mapped cluster schema to offer protection against the loss of more or less mapped nodes, e.g., in some embodiments where the mapped cluster redundancy is designed to withstand a loss of two mapped nodes, the related data loss protection rule can allow for one real node to support mapped disks from two mapped nodes of the same mapped cluster. It is again noted that all such data loss protection rules are considered within the scope of the present disclosure even where not explicitly recited for the sake of clarity and brevity.

Extent selection component 536 of mapped cluster control component 520 can select a free extent of a L'th disk of a J'th node that complies with applicable rules. The selected extent can be allocated to be part of a doubly mapped cluster. As an example, to allocate a new DMC, a first free extent can be allocated, and then a second free extent can be selected based on disk/node affinities relative to the allocated first free extent. The second free extent can be determined to comply with data protection rules and can then be allocated to the DMC. The disk/node affinities can be updated and a third free extent can be selected based on the updated disk/node affinities. This process can continue until the DMC allocation is completed.

In an aspect, selection of an extent can be designated to select a free extent of a node having a lowest Y[i,j] value and then, for that J'th node, a free extent having disk a lowest X[k,l] value. As such, a selected extent would be of an L'th disk of a J'th node having low affinity values. Assignment of that extent to a DMC would be associated with then increasing the corresponding node and disk-level affinities. As is noted hereinabove, increased affinities can be beneficial. Moreover, the example selection of that extent occurs on lowest affinity values at each iteration and therefore lower values will be pulled up before higher values, which through the iterations needed to allocate a DMC can serve to balance affinity values, e.g., rather than affinity values becoming more skewed by repeatedly selecting extents that already have higher affinities than other free extents, example system 500 preferentially selects lower affinity valued free extents more uniformly.

Figure 6:
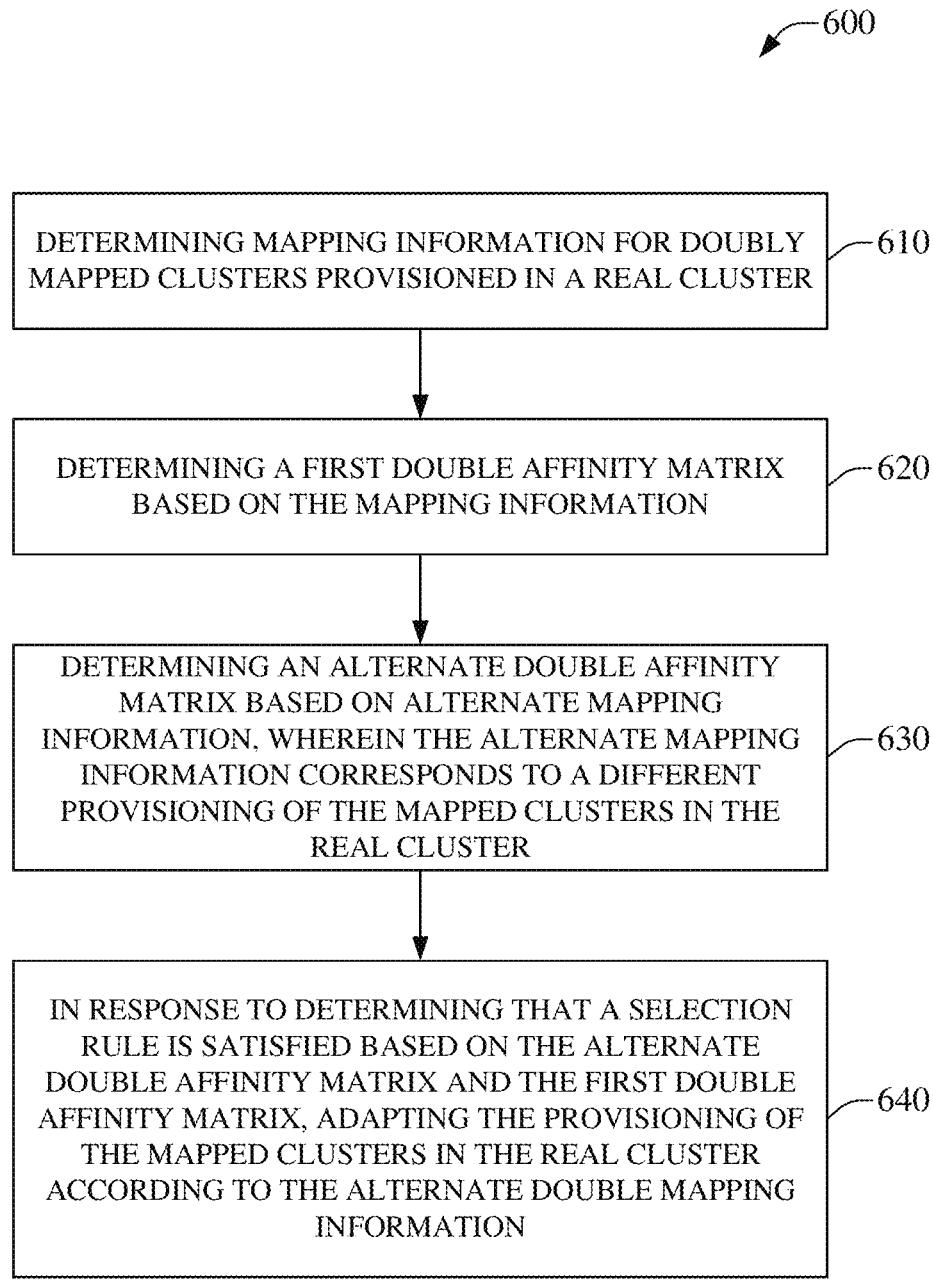
FIG. 6 is an illustration of an example method facilitating affinity sensitive data storage distribution of data across real storage devices, in accordance with aspects of the subject disclosure.
Figure 7:
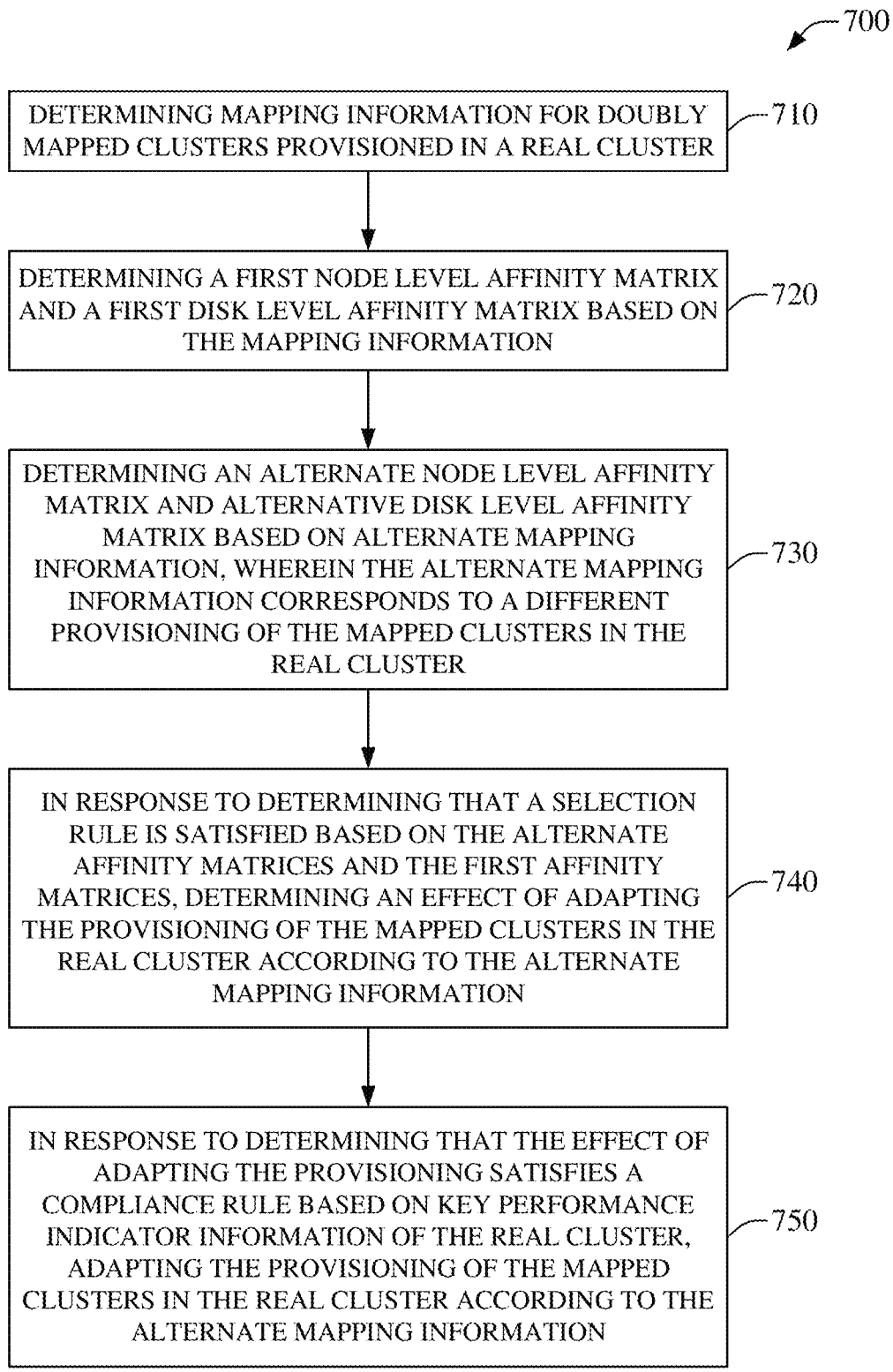
FIG. 7 is an illustration of an example method facilitating affinity sensitive data storage distribution of data across real storage devices wherein a distributed storage scheme can be selected based on a corresponding level of robustness, in accordance with aspects of the subject disclosure.
Figure 8:
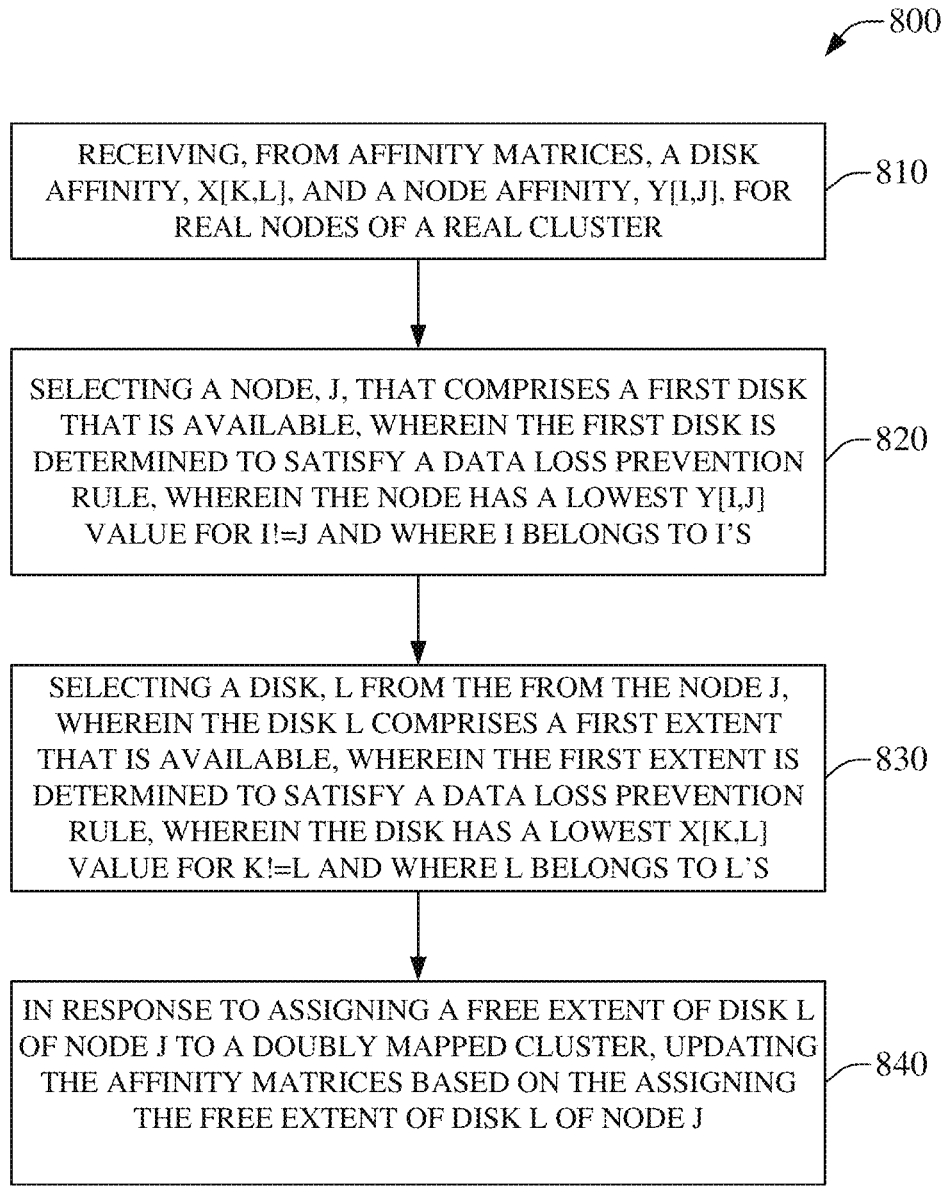
FIG. 8 illustrates an example method enabling affinity sensitive data storage distribution of logical data across real storage devices, in accordance with aspects of the subject disclosure.

In view of the example system(s) described above, example method(s) that can be implemented in accordance with the disclosed subject matter can be better appreciated with reference to flowcharts in FIG. 6-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 6 is an illustration of an example method 600 that can facilitate affinity sensitive data storage distribution of data across real storage devices, in accordance with aspects of the subject disclosure. Method 600, at 610, can comprise determining mapping information for mapped clusters provisioned in a real cluster. Mapped extents of mapped disks of mapped nodes of a mapped cluster can map to nearly any constellation of real storage locations, e.g., real extents of real disks of real nodes of real clusters, or portions thereof, etc. The mapping information can indicate which portions of a real cluster are provisioned in support of one or more mapped disks of one or more mapped nodes of one or more mapped clusters.

At 620, method 600 can comprise determining a first double affinity matrix based on the mapping information. A double affinity matrix can reflect disk-level affinities and node-level affinities, e.g., as described in conjunction with FIG. 4, etc. Affinity between real nodes can be based on a count of real disks participating in a mapped cluster. Affinity between real disks can be based on a count of real extents participating in a mapped cluster. A higher node-level affinity score can indicate that a real node comprises real disks participating in more mapped clusters than a real node with a lower affinity score, e.g., the real node can increase an affinity score by having disks participating in more mapped nodes and thereby having an affinity with more other real nodes. A higher disk-level affinity score can indicate that a real disk comprises real extents participating in more mapped clusters than a real disk with a lower affinity score, e.g., the real disk can increase an affinity score by having extents participating in more mapped disks and thereby having an affinity with more other real disks. An double affinity matrix can be an NM×NM matrix, where M is a count of real disks and N is a count of real nodes of a real cluster, having values in a third dimension reflecting a determined level of affinity. A value Y[i,j] in a double affinity matrix can indicate a number of disks an $i^{th}$ real node and $j^{th}$ real node donate to a same mapped cluster. A value X[k,l] in a double affinity matrix can indicate a number of extents an $k^{th}$ real disk and $l^{th}$ real disk donate to a same mapped cluster. It is noted that the greater the level of similarity in affinity values across an affinity matrix, typically the more robust the storage scheme is against a real node or real disk becoming less accessible, e.g., when values Y(i,j|i!)=j are more similar the storage scheme is generally more robust than when the values are less similar, and when values X(k,l|k!)=1 are more similar the storage scheme is generally more robust than when the values are less similar. This can result in stored data being more accessible, that is, more data can be accessed even in the event of a real node becoming less accessible. Further, recovery of data from a less accessible real node or a less accessible real disk can also be improved, as previously discussed, when the affinity values are more similar in contrast to the affinity values being less similar.

At 630, an alternate double affinity matrix can be determined based on alternate mapping information. In an aspect, alternate mapping information can be based on a perturbation of the mapping information at 610. As such, the alternate mapping information can correspond to a different provisioning of the mapped clusters in the real cluster, e.g., the double affinity matrix for different possible mappings of a DMC can be evaluated to select a preferred mapping based on the corresponding affinity values. In an embodiment, other mappings can be determined and corresponding alternate double affinity matrixes can be determined. This can aid in selecting a preferred double affinity matrix, for example, a double affinity matrix that has high affinity scores and is flat/balanced, e.g., there can be low deviation between affinity scores in a selected alternate double affinity matrix. Whereas a selected alternate double affinity matrix corresponds to an alternate mapping, the alternate mapping can be used to alter the provisioning of real disks supporting corresponding mapped clusters in a manner than can improve the accessibility of stored data.

At 640, method 600 can comprise determining that a selection rule based on the alternate double affinity matrix and the first double affinity matrix is satisfied and, as a result, adapting the provisioning of the mapped clusters in the real cluster in accord with the alternate mapping information that corresponds to the alternate double affinity matrix. At this point method 600 can end. In an example, where the alternate double affinity matrix has better affinity scores, less deviation between affinity scores, etc., in comparison to the first double affinity matrix, then the alternate double affinity matrix can represent an improvement to the storage of data and the provisioning of real disks supporting doubly mapped clusters can be, accordingly, adapted. This can result in storing data of a doubly mapped cluster in the real cluster in a manner that allows the stored data to have higher accessibility, more robustness against loss of a real node, improved recovery from a real node becoming less accessible, etc.

FIG. 7 is an illustration of an example method 700, facilitating affinity sensitive data storage distribution of data across real storage devices wherein a distributed storage scheme can be selected based on a corresponding level of robustness, in accordance with aspects of the subject disclosure. At 710, method 700 can comprise determining mapping information for doubly mapped clusters provisioned in a real cluster. Mapped extents of mapped disks of mapped nodes of a doubly mapped cluster can map to nearly any constellation of real storage locations, e.g., real extents of real disks of real nodes of real clusters, or portions thereof, etc. The mapping information can indicate which portions of a real cluster are provisioned in support of one or more mapped disks of one or more mapped nodes of one or more doubly mapped clusters.

At 720, method 700 can comprise determining a first node-level affinity matrix based on the mapping information. An affinity between real nodes can be based on a count of real disks participating in a mapped cluster. A higher affinity score can indicate that a real node comprises real disks participating in more doubly mapped clusters than a real node with a lower affinity score, e.g., the real node can increase an affinity score by having disks participating in more mapped nodes and thereby having an affinity with more other real nodes. An node-level affinity matrix can be an N×N matrix, where N is a count of real nodes of the real cluster, having values in a third dimension reflecting a determined level of nodal affinity. A value Y(i,j) in a node-level affinity matrix can indicate a number of disks an $i^{th}$ real node and $j^{th}$ real node donate to a same mapped cluster. It will be noted that X(i,i)=0, and further noted that X(i,j)=X(j,i). It is noted that the greater the level of similarity in affinity values across a node-level affinity matrix, typically the more robust the storage scheme is against a real node becoming less accessible, e.g., when values X(i,j|i!)=j are more similar the storage scheme is generally more robust than when the values are less similar. This can result in stored data being more accessible, that is, more data can be accessed even in the event of a real node becoming less accessible. Further, recovery of data from a less accessible real node is also improved, as previously discussed, when the affinity values are more similar in contrast to the affinity values being less similar.

Further at 720, method 700 can comprise determining a first disk-level affinity matrix based on the mapping information. An affinity between real disks can be based on a count of real disk extents participating in a mapped node of a doubly mapped cluster. A higher affinity score can indicate that a real disk comprises real extents participating in more doubly mapped clusters than a real disk with a lower affinity score, e.g., the real disk can have an increased affinity score by having extents participating in more mapped disks and thereby having an affinity with more other real disks. An disk-level affinity matrix can be an NM×NM matrix, where M is a count of disks and N is a count of real nodes of the real cluster, having values in a third dimension reflecting a determined level of disk affinity. A value X(k,l) in a node-level affinity matrix can indicate a number of extents an $k^{th}$ real disk and $l^{th}$ real disk donate to a same mapped cluster. It will be noted that X(k,k)=0, and further noted that X(k,l)=X(l,k). It is noted that the greater the level of similarity in affinity values across a disk-level affinity matrix, typically the more robust the storage scheme is against a real disk becoming less accessible, e.g., when values X(k,llk!)=1 are more similar, the storage scheme is generally more robust than when the values are less similar. This can result in stored data being more accessible, that is, more data can be accessed even in the event of a real disk becoming less accessible. Further, recovery of data from a less accessible real disk is also improved, as previously discussed, when the affinity values are more similar in contrast to the affinity values being less similar.

At 730, an alternate node-level affinity matrix and an alternate disk-level affinity matrix can be determined based on alternate mapping information. The alternate mapping information can correspond to a prospectively different provisioning of the doubly mapped clusters in the real cluster. In an embodiment, other potential mappings can be determined and corresponding alternate node/disk affinity matrixes can be determined. This can aid in selecting a preferred node affinity matrix and disk affinity matrix.

Method 700, at 740, can comprise determining that a selection rule based on the alternate node/disk affinity matrices and the first node/disk affinity matrices is satisfied and, in response, can determine an effect of adapting the provisioning of mapped disks of mapped nodes of a doubly mapped cluster in the real cluster according to the alternate mapping information. In an aspect, rather than simply implementing an alternate provisioning based on the affinities, method 700 can further determine if implementing the alternate provisioning can result in other effects. These expected effects can then be reviewed prior to adapting the provisioning. This can forestall negative effects that can result from adapting the provisioning based solely on improved node/disk affinities.

At 750, method 700, can comprise adapting the provisioning of the doubly mapped cluster in the real cluster in accord with the alternate mapping information that corresponds to the alternate node/disk affinity matrices in response to determining that the effect determined at 740 satisfies a compliance rule. In an embodiment, the compliance rule can be based on key performance indicator(s) (KPIs) of the real cluster. As an example, where the effect at 740 is assigning a real disk from an older real node to support the mapped cluster, then the KPIs of the older real cluster can be used to determine if the compliance rule is satisfied. In this example, if the older real node KPIs indicate that the node has sufficiently fast processor(s), then the compliance rule can be satisfied. As a second example, if the older real node KPIs indicate that the node becomes less accessible sufficiently frequently, then the compliance rule may not be satisfied. As a third example, where the older real node KPIs indicate that the node is not rated for high security data, then the compliance rule may not be satisfied where a customer agreement indicates that data must be stored on devices rated for high security data. Numerous other examples are readily appreciated and fall within the scope of the present disclosure even where note explicitly recited for the sake of clarity and brevity.

Where the compliance rule is determined to be satisfied at 750, method 700 can comprise adapting the provisioning of the doubly mapped cluster in the real cluster according to the alternate mapping information. At this point method 700 can end. This can result in storing data of a doubly mapped cluster in the real cluster in a manner that allows the stored data to have higher accessibility, more robustness against loss of a real node, improved recovery from a real node becoming less accessible, etc. Moreover, the effects of the alternate provisioning can also have been determined to satisfy the compliance rule.

FIG. 8 is an illustration of an example method 800, which can enable affinity sensitive data storage distribution of logical data across real storage devices, in accordance with aspects of the subject disclosure. At 810, method 800 can comprise receiving, from affinity matrices, a disk affinity X[k,l] and a node affinity Y[i,j] for real nodes of a real cluster. A higher affinity score can indicate that greater robustness of data. Similarly, the greater the level of similarity in disk affinity values across a disk affinity matrix, or node affinity values across a node affinity matrix, typically the more robust the storage scheme is against a real disk, or correspondingly a real node, becoming less accessible. Use of extents of a real cluster in a doubly mapped cluster that demonstrates higher affinity values and/or flatter affinity values can be associated with stored data being more accessible, that is, more data can be accessed even in the event of a real disk/node becoming less accessible. Further, recovery of data from a less accessible real disk/node is also improved, as previously discussed, when the affinity values are more similar in contrast to the affinity values being less similar.

At 820, method 800 can comprise, selecting a node T that comprises a first disk that is available. The first disk should not violate a data loss protection rule. Moreover, the node should have a lowest Y[i,j] value for i!=j where i belongs to i's. In an aspect, method 800 at 820 can select a lowest node affinity node as a target, e.g., from which to similarly select a lowest disk affinity disk in relation to selecting a free extent to assign to a doubly mapped cluster. Accordingly, in an aspect, this allows increasing a low affinity value, broadening diversity, etc. In an example, a node that does not participate in a doubly mapped cluster can have a first affinity value, e.g., zero, whereby assigning an extent of a disk of the node will increase the affinity value and also broaden the diversity of nodes participating in a doubly mapped cluster. This can be associated with the aforementioned benefits. At 820, method 800 can be viewed as selecting a node that will improve data robustness. This robustness can be further improved by selecting an appropriate disk of node J at 830.

Method 800, at 830, can comprise selecting a disk 'L' that comprises a first extent that is available. The first extent should not violate a data loss protection rule. Moreover, the disk should have a lowest X[k,l] value for k!=1 where k belongs to k's. The disk L can therefore be a lowest disk affinity disk. Accordingly, in an aspect, selection of a lowest affinity disk can allows increasing a low disk affinity value, broadening cluster diversity, etc. In an example, a disk that does not participate in a doubly mapped cluster can have a first affinity value, e.g., zero, whereby assigning an extent of the disk will increase the affinity value and also broaden the diversity of disks participating in a node of a doubly mapped cluster. This can be associated with the aforementioned benefits. At 830, method 800 can be viewed as selecting a disk L of node J that will improve data robustness.

At 840, a free extent of disk L of node J can be assigned to a doubly mapped cluster. The free extent can be available to participate in the doubly mapped cluster based on satisfying the data loss protection rule(s), and can be associated with lowest node and disk affinities. As such, adding this extent to a doubly mapped cluster when provisioning or allocating the doubly mapped cluster can act to both increase node and/or disk affinity values and can also serve to better diversify data storage to provide more robustness against possible loss of a real node or real disk as discussed elsewhere herein. In response to the assigning of the free extent to a doubly mapped cluster, the affinity matrices can be updated. At this point, method 800 can end. However, where allocation of all doubly mapped clusters is not yet complete, method 800 can return to 810 and employ the updated affinity matrices in selecting a next extent for allocation into a doubly mapped cluster. This can repeat until the doubly mapped cluster allocations are completed.

Figure 9:
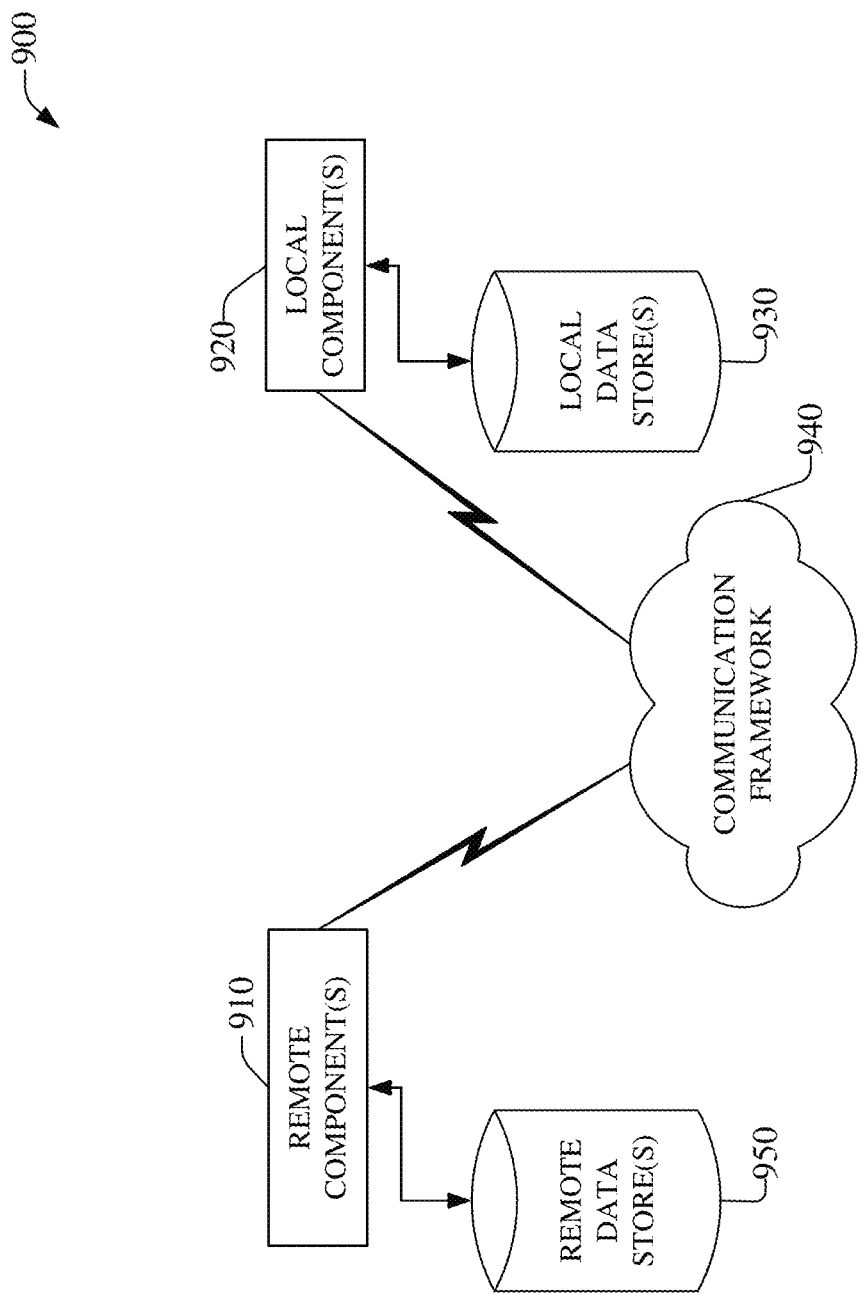
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be real nodes of a real cluster in communication with other real nodes of the real cluster that can be located in a different physical location. Communication framework 940 can comprise wired network devices, wireless network devices, mobile devices, wearable devices, radio access network devices, gateway devices, femtocell devices, servers, etc. In an aspect, a real cluster can be comprised of physically disparate devices, e.g., a real cluster can comprise devices in entirely different data centers, different cities, different states, different countries, etc.

The system 900 also comprises one or more local component(s) 920. The local component(s) 920 can be hardware and/or software (e.g., threads, processes, computing devices). In some embodiments, local component(s) 920 can be real nodes of a real cluster in communication with other real nodes of the real cluster that can be located in a different physical location.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940. As an example, remote and local real nodes can communicate KPIs, move stored data between local and remote real nodes, such as when a mapping of mapped clusters to a real cluster is updated based on affinity score, etc.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, comprised in a cluster storage construct 102, 202, 502, etc., e.g., in the nodes thereof, comprise in mapped cluster control component 220, 310, 520, etc., or comprised in other components disclosed herein, can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations, comprising receiving current affinity values, first predicted affinity values, and second predicted affinity values that can be employed in provisioning mapped disks to real disks, wherein the provisioning can be based on a mapping of corresponding mapped disks and real disks, and wherein the mapping can be selected according to the current, first predicted, and second predicted affinity values, etc., as is disclosed herein.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial busport can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A and a second embodiment that has aspect B does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30 GHz) and infrared (IR) waves, and are sometimes referred to extremely high frequency (EHF). The wavelength ($\lambda$) for millimeter waves is typically in the 1-mm to 10-mm range.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:
      receiving first mapping data indicating a first allocation of a first real storage device comprised in a first real disk of a first real node comprised in a real storage cluster, wherein the first allocation of the first real storage device supports a first representation of a first mapped storage device comprised in a first mapped node of a first mapped storage cluster;
      determining a first node affinity score of the first real node according to a node affinity matrix of the real storage cluster, wherein the first node affinity score corresponds to a count of mapped clusters that are supported by the first real node;
      determining a first disk affinity score of the first real disk of the first real node according to a disk affinity matrix of the real storage cluster, wherein the first disk affinity score corresponds to a count of mapped clusters that are supported by the first real disk;
      allocating the first real storage device based on the first node affinity score and the first disk affinity score; and
      in response to the allocating the first real storage device, updating the node affinity matrix and the disk affinity matrix, resulting in an updated node affinity matrix and an updated disk affinity matrix.

2. The system of claim 1, wherein the operations further comprise:
   receiving second mapping data indicating a second allocation of a second real storage device comprised in a second real disk of a second real node comprised in the real storage cluster, wherein the second allocation of the second real storage device supports a second representation of a second mapped storage device comprised in a second mapped node of a second mapped storage cluster;
   determining a second node affinity score of the second real node according to the updated node affinity matrix of the real storage cluster;
   determining a second disk affinity score of the second real disk according to the updated disk affinity matrix of the real storage cluster;
   allocating the second real storage device based on the second node affinity score and the second disk affinity score; and
   in response to the allocating the second real storage device, updating the updated node affinity matrix and the updated disk affinity matrix.

3. The system of claim 1, wherein the disk affinity matrix is comprised in the node affinity matrix.

4. The system of claim 2, wherein the second mapped storage cluster is a same mapped storage cluster as the first mapped storage cluster.

5. The system of claim 2, wherein the second mapped node is a same mapped node as the first mapped node.

6. The system of claim 2, wherein the second real node is a same real node as the first real node.

7. The system of claim 2, wherein the second real disk is a same real disk as the first real disk.

8. The system of claim 1, wherein the allocating the first real storage device is further based on determining that at least one compliance rule is satisfied, and wherein the at least one compliance rule is based on a key performance indicator of the real storage cluster.

9. The system of claim 1, wherein the allocating the first real storage device is based on a rank of the first node affinity score among other node affinity scores corresponding to other real nodes of the real storage cluster.

10. The system of claim 1, wherein the allocating the first real storage device is based on a rank of the first disk affinity score among other disk affinity scores corresponding to other real disks of the real storage cluster.

11. The system of claim 1, wherein the allocating the first real storage device is based on a level of similarity between node affinity scores corresponding to real nodes of the real storage cluster, wherein the node affinity scores comprise the first node affinity score, and wherein the real nodes comprise the first real node.

12. The system of claim 1, wherein the allocating the first real storage device is based on a level of similarity between disk affinity scores corresponding to real disks of the real storage cluster, wherein the disk affinity scores comprise the first disk affinity score, and wherein the real disks comprise the first real disk.

13. A method, comprising:
    determining, by a system comprising a processor and a memory, current affinity values for a current double affinity matrix corresponding to a first mapping of first mapped disks of mapped clusters to first real disks of a real cluster, wherein the current doubly affinity matrix reflects at least one current node affinity value and one current disk affinity value, wherein a node affinity value of the at least one current node affinity value corresponds to a count of mapped clusters that are supported by a first real node of the real cluster, and wherein a disk affinity value of the at least one current disk affinity value corresponds to a count of mapped clusters that are supported by a real disk of the first real disks;
    determining, by the system, first predicted affinity values for a first updated double affinity matrix corresponding to a second mapping of second mapped disks of the mapped clusters to second real disks of the real cluster, wherein the second mapping is a different mapping than the first mapping, wherein the updated doubly affinity matrix reflects at least one updated node affinity value and one updated disk affinity value; and
    in response to determining that a selection rule is satisfied based on the current affinity values and the first updated affinity values, allocating, by the system, the second real disks in accord with the second mapping.

14. The method of claim 13, further comprising:
    determining, by the system, second predicted affinity values for a second updated double affinity matrix corresponding to a third mapping of third mapped disks of the mapped clusters to third real disks of the real cluster, wherein the third mapping is a different mapping than the second mapping, wherein the second updated doubly affinity matrix reflects an additional updated node affinity value and an additional updated disk affinity value; and
    in response to determining that the selection rule is satisfied based on the first predicted affinity values and the second predicted affinity values, allocating, by the system, the third real disks in accord with the third mapping.

15. The method of claim 13, wherein the allocating the second real disks in accord with the second mapping is further based on determining that the second mapping satisfies a compliance rule based on a key performance indicator of the real cluster.

16. The method of claim 13, further comprising,
in response to determining that the selection rule is not satisfied based on the current affinity values and the first updated affinity values, determining, by the system, second predicted affinity values for a second updated double affinity matrix corresponding to a third mapping of second mapped disks of the mapped clusters to third real disks of the real cluster, wherein the third mapping is a different mapping than either the first mapping or the second mapping; and
in response to determining that the selection rule is satisfied based on the current affinity values and the second updated affinity values, allocating, by the system, the third real disks in accord with the third mapping.

17. A non-transitory machine-readable storage medium, comprising executable instructions that, when executed by a processor, facilitate performance of operations, comprising:
receiving current node affinity values and current disk affinity values corresponding to a current mapping of first mapped disks of mapped clusters with first real disks of a real cluster, wherein a node affinity value of the current node affinity values corresponds to a count of mapped clusters that are supported by a first real node of the real cluster, and wherein a disk affinity value of the current disk affinity values corresponds to a count of mapped clusters that are supported by a real disk of the first real disks;
receiving first predicted node affinity values and first predicted disk affinity values corresponding to a first alternate mapping of second mapped disks of the mapped clusters with second real disks of the real cluster;
receiving second predicted node affinity values and second predicted disk affinity values corresponding to a second alternate mapping of third mapped disks of the mapped clusters with third real disks of the real cluster;
in response to determining that a selection rule is satisfied based on the current node affinity values and current disk affinity values, the first predicted node affinity values and first predicted disk affinity values, and the second predicted node affinity values and second predicted disk affinity values, selecting a selected mapping, selected mapped disks corresponding to the selected mapping, and selected real disks corresponding to the selected mapping, wherein the selected mapping is selected from a group of mappings comprising the first alternate mapping and the second alternate mapping; and provisioning the selected mapped disks by allocating the selected real disks in accord with the selected mapping..

18. The non-transitory machine-readable storage medium of claim 17, wherein, subsequent to the provisioning the selected mapped disks, the operations further comprise:
receiving updated current node affinity values updated current disk affinity values corresponding to a now current mapping of the selected mapped disks of the mapped clusters with the selected real disks of the real cluster;
receiving third predicted node affinity values and third predicted disk affinity values corresponding to a third alternate mapping of fourth mapped disks of the mapped clusters with fourth real disks of the real cluster;
receiving fourth predicted node affinity values and fourth predicted disk affinity values corresponding to a fourth alternate mapping of fifth mapped disks of the mapped clusters with fifth real disks of the real cluster;
in response to determining that the selection rule is satisfied based on the updated current node affinity values and updated current disk affinity values, the third predicted node affinity values and third predicted disk affinity values, and the fourth predicted node affinity values and fourth predicted disk affinity values, selecting a next selected mapping, next selected mapped disks corresponding to the next selected mapping, and next selected real disks corresponding to the next selected mapping, wherein the next selected mapping is selected from another group of mappings comprising the third alternate mapping and the fourth alternate mapping; and
provisioning the next selected mapped disks by allocating the next selected real disks in accord with the next selected mapping.

19. The non-transitory machine-readable storage medium of claim 17, wherein the provisioning the selected mapped disks is further based on determining that the selected mapping satisfies a compliance rule based on a key performance indicator of the real cluster.

20. The non-transitory machine-readable storage medium of claim 17, wherein the provisioning the selected mapped disks is further based on determining that the selected mapping satisfies a data loss prevention rule prohibiting allocation of more than one real disk of one real node of the real cluster to more than one mapped node of a single mapped cluster of the mapped clusters.

* * * * *